United States Patent [19]

Adachi et al.

[11] Patent Number: 5,148,089
[45] Date of Patent: Sep. 15, 1992

[54] METHOD AND APPARATUS FOR CONTROLLING MOTORS

[75] Inventors: Hideki Adachi, Kawasaki; Mitsuharu Takizawa, Fuchu; Miho Nakayama, Tokyo; Taisei Fukada, Yokohama; Shinichi Nakamura, Kawasaki; Satoshi Kuroyanagi, Nishimine; Hisatsugu Tahara, Kawasaki; Hiroshi Ozaki, Tokyo; Masanori Miyata, Yokohama, all of Japan

[73] Assignee: Canon Kabushiki Kaisha, Tokyo, Japan

[21] Appl. No.: 574,451

[22] Filed: Aug. 29, 1990

[30] Foreign Application Priority Data

| Aug. 31, 1989 | [JP] | Japan | 1-222801 |
| Aug. 31, 1989 | [JP] | Japan | 1-222802 |
| Aug. 31, 1989 | [JP] | Japan | 1-222804 |
| Aug. 31, 1989 | [JP] | Japan | 1-222805 |
| Aug. 31, 1989 | [JP] | Japan | 1-222806 |
| Aug. 31, 1989 | [JP] | Japan | 1-222808 |
| Aug. 31, 1989 | [JP] | Japan | 1-222809 |

[51] Int. Cl.$^5$ .......................... G03G 15/32
[52] U.S. Cl. .......................... 318/66; 318/799; 318/70; 364/426.01; 364/807
[58] Field of Search .......................... 318/66, 68, 70, 71, 318/558, 779, 798, 799, 807–811; 364/424.1, 426.01, 426.09, 148, 807; 355/133; 354/354

[56] References Cited

U.S. PATENT DOCUMENTS

| 4,305,652 | 12/1981 | Dattilo et al. | 355/6 |
| 4,716,438 | 12/1987 | Farrell | 355/14 |
| 4,860,243 | 8/1989 | Ueno et al. | 364/807 |
| 4,910,684 | 3/1990 | Ostergaard et al. | 364/148 |
| 4,930,084 | 5/1990 | Hosaka et al. | 364/424.1 |
| 5,005,133 | 4/1991 | Takahashi | 364/426.4 |

FOREIGN PATENT DOCUMENTS 0260892 3/1988 European Pat. Off. .
0402143 12/1990 European Pat. Off. .

OTHER PUBLICATIONS

Johnson, "Fuzzylogig", Jul., 1990, all pages, *Popular Science*.
Mamdani, "Advances in the Linguistic synthesis of Fuzzy logic", Apr. 24, 1976, all pages, *Int. J. Man-Machine Studies*.

Primary Examiner—William M. Shoop, Jr.
Assistant Examiner—John W. Cabeca
Attorney, Agent, or Firm—Fitzpatrick, Cella, Harper & Scinto

[57] ABSTRACT

An apparatus and method for controlling the velocity of a motor controls the motor by fuzzy inferential reasoning in a transitional period when the motor is started, changed in speed, reversed or stopped. Such fuzzy control eliminates an increase in the length of the transitional period caused by a limitation in supply current under conventional PLL control and makes possible a rapid transition to a target velocity. A plurality of fuzzy rules are provided and one of these fuzzy rules is selected in accordance with the length of the previous transitional period, thereby suppressing the effects of load fluctuation and the influence of a fluctuation in torque caused by a rise in temperature. Therefore, the length for transitional control of a motor can be shortened and the apparatus can be reduced in size.

55 Claims, 22 Drawing Sheets (RULES AT ACCELERATION)

VELOCITY DEVIATION = Ss and DISTANCE DEVIATION = Sd → CONTROL VARIABLE = Mc
VELOCITY DEVIATION = Ss and DISTANCE DEVIATION = Md → CONTROL VARIABLE = Sc
VELOCITY DEVIATION = Ss and DISTANCE DEVIATION = Ld → CONTROL VARIABLE = Sc
VELOCITY DEVIATION = Ms and DISTANCE DEVIATION = Sd → CONTROL VARIABLE = Mc
VELOCITY DEVIATION = Ms and DISTANCE DEVIATION = Md → CONTROL VARIABLE = Sc
VELOCITY DEVIATION = Ms and DISTANCE DEVIATION = Ld → CONTROL VARIABLE = Sc
VELOCITY DEVIATION = Ls and DISTANCE DEVIATION = Sd → CONTROL VARIABLE = Mc
VELOCITY DEVIATION = Ls and DISTANCE DEVIATION = Md → CONTROL VARIABLE = Mc
VELOCITY DEVIATION = Ls and DISTANCE DEVIATION = Ld → CONTROL VARIABLE = Lc

FIG. 4A (RULES AT ACCELERATION)

VELOCITY DEVIATION = Ss and DISTANCE DEVIATION = Sd → CONTROL VARIABLE = Mc
VELOCITY DEVIATION = Ss and DISTANCE DEVIATION = Md → CONTROL VARIABLE = Sc
VELOCITY DEVIATION = Ss and DISTANCE DEVIATION = Ld → CONTROL VARIABLE = Sc
VELOCITY DEVIATION = Ms and DISTANCE DEVIATION = Sd → CONTROL VARIABLE = Mc
VELOCITY DEVIATION = Ms and DISTANCE DEVIATION = Md → CONTROL VARIABLE = Mc
VELOCITY DEVIATION = Ms and DISTANCE DEVIATION = Ld → CONTROL VARIABLE = Sc
VELOCITY DEVIATION = Ls and DISTANCE DEVIATION = Sd → CONTROL VARIABLE = Mc
VELOCITY DEVIATION = Ls and DISTANCE DEVIATION = Md → CONTROL VARIABLE = Mc
VELOCITY DEVIATION = Ls and DISTANCE DEVIATION = Ld → CONTROL VARIABLE = Lc

FIG. 4B (ORDINARY RULES AT ACCELERATION)

| | | |
|---|---|---|
| VELOCITY DEVIATION = Ss and | DISTANCE DEVIATION = Sd | → CONTROL VARIABLE = Mc |
| VELOCITY DEVIATION = Ss and | DISTANCE DEVIATION = Md | → CONTROL VARIABLE = Sc |
| VELOCITY DEVIATION = Ss and | DISTANCE DEVIATION = Ld | → CONTROL VARIABLE = Sc |
| VELOCITY DEVIATION = Ms and | DISTANCE DEVIATION = Sd | → CONTROL VARIABLE = Mc |
| VELOCITY DEVIATION = Ms and | DISTANCE DEVIATION = Md | → CONTROL VARIABLE = Sc |
| VELOCITY DEVIATION = Ms and | DISTANCE DEVIATION = Ld | → CONTROL VARIABLE = Sc |
| VELOCITY DEVIATION = Ls and | DISTANCE DEVIATION = Sd | → CONTROL VARIABLE = Mc |
| VELOCITY DEVIATION = Ls and | DISTANCE DEVIATION = Md | → CONTROL VARIABLE = Ms |
| VELOCITY DEVIATION = Ls and | DISTANCE DEVIATION = Ld | → CONTROL VARIABLE = Lc |

(POST-CORRECTION RULES AT ACCELERATION)

| | | |
|---|---|---|
| VELOCITY DEVIATION = Ss and | DISTANCE DEVIATION = Sd | → CONTROL VARIABLE = Mc |
| VELOCITY DEVIATION = Ss and | DISTANCE DEVIATION = Md | → CONTROL VARIABLE = Sc |
| VELOCITY DEVIATION = Ss and | DISTANCE DEVIATION = Ld | → CONTROL VARIABLE = Sc |
| VELOCITY DEVIATION = Ms and | DISTANCE DEVIATION = Sd | → CONTROL VARIABLE = Mc |
| VELOCITY DEVIATION = Ms and | DISTANCE DEVIATION = Md | → CONTROL VARIABLE = Sc |
| VELOCITY DEVIATION = Ms and | DISTANCE DEVIATION = Ld | → CONTROL VARIABLE = Sc |
| VELOCITY DEVIATION = Ls and | DISTANCE DEVIATION = Sd | → CONTROL VARIABLE = Mc |
| VELOCITY DEVIATION = Ls and | DISTANCE DEVIATION = Md | → CONTROL VARIABLE = Lc |
| VELOCITY DEVIATION = Ls and | DISTANCE DEVIATION = Ld | → CONTROL VARIABLE = Lc |

FIG. 12A (ORDINARY RULES AT DECELERATION)

| | | | | |
|---|---|---|---|---|
| VELOCITY DEVIATION = Ss | and | DISTANCE DEVIATION = Sd | → | CONTROL VARIABLE = Mc |
| VELOCITY DEVIATION = Ss | and | DISTANCE DEVIATION = Md | → | CONTROL VARIABLE = Sc |
| VELOCITY DEVIATION = Ss | and | DISTANCE DEVIATION = Ld | → | CONTROL VARIABLE = Sc |
| VELOCITY DEVIATION = Ms | and | DISTANCE DEVIATION = Sd | → | CONTROL VARIABLE = Mc |
| VELOCITY DEVIATION = Ms | and | DISTANCE DEVIATION = Md | → | CONTROL VARIABLE = Mc |
| VELOCITY DEVIATION = Ms | and | DISTANCE DEVIATION = Ld | → | CONTROL VARIABLE = Sc |
| VELOCITY DEVIATION = Ls | and | DISTANCE DEVIATION = Sd | → | CONTROL VARIABLE = Mc |
| VELOCITY DEVIATION = Ls | and | DISTANCE DEVIATION = Md | → | CONTROL VARIABLE = Mc |
| VELOCITY DEVIATION = Ls | and | DISTANCE DEVIATION = Ld | → | CONTROL VARIABLE = Lc |

(POST-CORRECTION RULES AT DECELERATION)

| | | | | |
|---|---|---|---|---|
| VELOCITY DEVIATION = Ss | and | DISTANCE DEVIATION = Sd | → | CONTROL VARIABLE = Mc |
| VELOCITY DEVIATION = Ss | and | DISTANCE DEVIATION = Md | → | CONTROL VARIABLE = Sc |
| VELOCITY DEVIATION = Ss | and | DISTANCE DEVIATION = Ld | → | CONTROL VARIABLE = Sc |
| VELOCITY DEVIATION = Ms | and | DISTANCE DEVIATION = Sd | → | CONTROL VARIABLE = Mc |
| VELOCITY DEVIATION = Ms | and | DISTANCE DEVIATION = Md | → | CONTROL VARIABLE = Mc |
| VELOCITY DEVIATION = Ms | and | DISTANCE DEVIATION = Ld | → | CONTROL VARIABLE = Sc |
| VELOCITY DEVIATION = Ls | and | DISTANCE DEVIATION = Sd | → | CONTROL VARIABLE = Mc |
| VELOCITY DEVIATION = Ls | and | DISTANCE DEVIATION = Md | → | CONTROL VARIABLE = Lc |
| VELOCITY DEVIATION = Ls | and | DISTANCE DEVIATION = Ld | → | CONTROL VARIABLE = Lc |

FIG. 12B

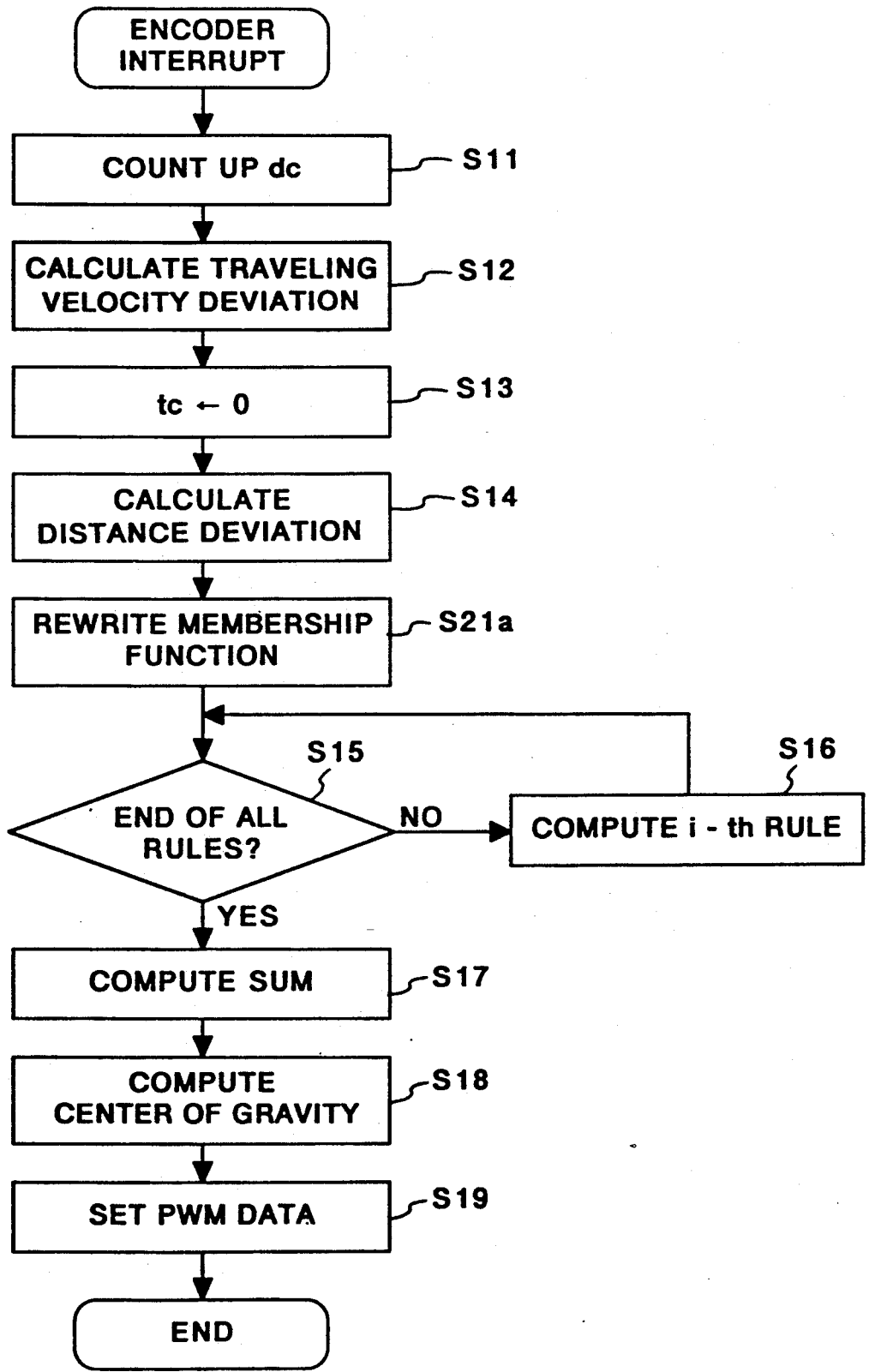
F I G. 19

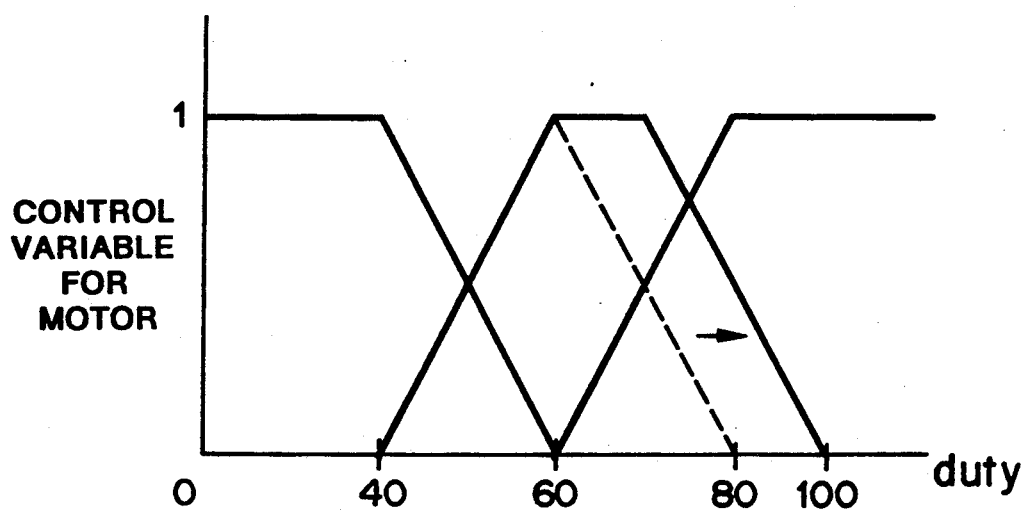
F I G. 20

METHOD AND APPARATUS FOR CONTROLLING MOTORS

BACKGROUND OF THE INVENTION

1. Field of the Invention

This invention relates to a method and apparatus for controlling motors. More particularly, the invention relates to a method and apparatus for controlling motors suitable for application to image formation, such an image-exposure drive motor, a polygon mirror drive motor and a photosensitive body drive motor.

2. Description of the Related Art

Conventionally, velocity control in an apparatus of this type is carried out by a phase-locked loop (referred to as a PLL). In such case, an internal constant (gain) of PLL control is changed over between a value which prevails in control of a transitional period, such as when a motor is started, and stopped, and has its direction of rotation changed, and a value which prevails in control under steady conditions following attainment of a target rotational speed. By adopting such an expedient, the supply of current to the motor at a transitional time is limited to suppress overshoot and effect a smooth transition to the steady state.

However, since the supply current to the motor at the transitional time is limited, there is an increase in the length of the transitional period. As a consequence, in the case of an image-exposure drive motor, the approach distance from the start to the leading edge of an image must be set long when the motor is started This leads to an apparatus of a large size. Another problem is that the length of the transitional period has an effect upon the period from exposure of one image to exposure of the next image In the case of a polygon mirror drive motor or photosensitive body drive motor, the length of the transitional period to attain a target rotational speed is increased at motor start-up or when changing over a target velocity. As a result, there is an increase in fast-copy time or in the time needed for reproduction requiring a changeover in speed.

SUMMARY OF THE INVENTION

Accordingly, an object of the present invention is to improve upon control in a transitional period. More specifically, an object of the invention is to provide a method and apparatus for controlling a motor, in which, at transitional time when the relation between a status variable and a control variable is ambiguous, the ambiguous relationship is controlled by computing the control variable using fuzzy inferential reasoning.

In order to attain the foregoing object, one aspect of the present invention is so adapted that when a motor is in a transitional period, a control variable of velocity is calculated by fuzzy inferential reasoning from an ambiguous relationship between the control variable of velocity and at least one status variable from among motor velocity, motor target velocity and the position of an object moved by the motor, which are detected by an encoder of the motor. The motor is then controlled based on the control variable of velocity.

If the motor is an image-exposure drive motor, the transitional period is the time required for the optical system to reach the proximity of the leading edge of the image after the start of motor drive, the time required for the motor to attain a target velocity after its rotating direction is reversed in order to reverse the traveling direction of the optical system, or time after the start of velocity control for the purpose of stopping motor drive.

If the motor is a polygon mirror drive motor or a photosensitive body drive motor, the transitional period is the time required for the motor to attain a target velocity after the start of motor drive, or the time required for the motor to attain a target velocity after the target velocity thereof is changed.

In the steady state in which there is no transitional period, motor velocity is controlled by a PLL using the motor velocity detected by the motor encoder and the target velocity of the motor.

Furthermore, in control of the transitional period, the influence of a fluctuation in a load due to a change in the apparatus with the passage of time and of a fluctuation in torque due to a rise in the temperature of the motor is large. If the rule used in fuzzy inferential reasoning or a function indicating the ambiguous relationship is fixed with regard to such fluctuation, a problem that arises is that the controlled state will vary.

Accordingly, another object of the present invention is to provide a method and apparatus for controlling a motor in an image forming apparatus, in which control of a transitional period using fuzzy inferential reasoning is improved to deal with the aforementioned fluctuation.

In order to attain the foregoing object, another aspect of the present invention is such that a plurality of fuzzy rules are provided. When a motor is in a transitional period, a predetermined rule is selected from among the plurality of fuzzy rules corresponding to the length of the transitional period, a control variable of velocity is calculated by fuzzy inferential reasoning from an ambiguous relationship between the control variable of velocity and at least one status variable from among motor velocity, motor target velocity and the position of an object moved by the motor, which are detected by an encoder of the motor. The motor is then controlled based on the control variable of velocity.

Further, when a motor is in a transitional timing, one ambiguous relationship is selected, corresponding to the length of transitional period, from a plurality of ambiguous relationships between a control variable of velocity and at least one status variable from among motor velocity, motor target velocity and the position of an object moved by the motor, which are detected by an encoder of the motor, the control variable of velocity is calculated by fuzzy inferential reasoning, and the motor is then controlled based on the control variable of velocity.

If the motor is an image-exposure drive motor, the transitional period is the time required for the optical system to reach the proximity of the leading edge of the image after the start of motor drive, the time required for the motor to attain a target velocity after its rotating direction is reversed in order to reverse the traveling direction of the optical system, or time after the start of velocity control for the purpose of stopping motor drive.

If the motor is a polygon mirror drive motor or a photosensitive body drive motor, the transitional period is the time required for the motor to attain a target velocity after the start of motor drive, or the time required for the motor to attain a target velocity after the target velocity thereof is changed.

In the steady state in which there is no transitional period, motor velocity is controlled by a PLL using the motor velocity detected by the motor encoder and the target velocity of the motor.

In accordance with the present invention, at the time of transitional control of a motor in an image forming apparatus, such as when starting the motor, changing over rotational velocity or direction of rotation or stopping the motor, a changeover is made to velocity control so that the length of transitional period can be shortened.

In particular, if the motor is an image-exposure drive motor, a changeover is made to velocity control based on fuzzy inferential reasoning at the time of transitional control, such as when the motor is started, when the direction of rotation is changed over and when the motor is stopped. As a result, the length of transitional period can be shortened, the effect upon the period from one image exposure to the next can be reduced, and the approach distance can be set to be short. This makes it possible to reduce the size of the apparatus.

If the motor is a polygon mirror drive motor or a photosensitive body drive motor, a changeover is made to velocity control based on fuzzy inferential reasoning at the time of transitional control, such as when the motor is started or when the direction of rotation is changed over. As a result, the length of transitional period can be shortened and it is possible to curtail fast-copy time as well as the time needed for reproduction requiring a velocity changeover.

Furthermore, since time is shortened and a smooth transition to the steady state is achieved, the apparatus can be made compact and image quality can be stabilized.

Further, the invention measures the length of the transitional period of a motor in an image forming apparatus, e.g., at such transitional control period as when an image-exposure drive motor is started, changed over in direction of rotation and stopped, and when a polygon mirror or photosensitive body is started and changed over in velocity, and changes over a plurality of rules or functions indicating ambiguous relationships used in fuzzy inferential reasoning in accordance with the measurement data. This makes possible stabilized control with respect to a fluctuation in load due to a change with the passage of time or a fluctuation in torque due to a rise in motor temperature.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are diagrams showing fuzzy rules of a first or third embodiment;

FIGS. 12A and 12B are the diagrams showing fuzzy rules according to a second embodiment;

FIG. 19 is a flowchart showing the procedure of an encoder interrupt routine in the third embodiment;

FIG. 20 is a diagram showing an example of membership functions in which FIG. 3C has been rewritten corresponding to the length of transitional period in the third embodiment.

DESCRIPTION OF THE PREFERRED EMBODIMENTS

Preferred embodiments of the present invention will now be described in detail with reference to the drawings.

EXAMPLE OF CONSTRUCTION

Figure 2:
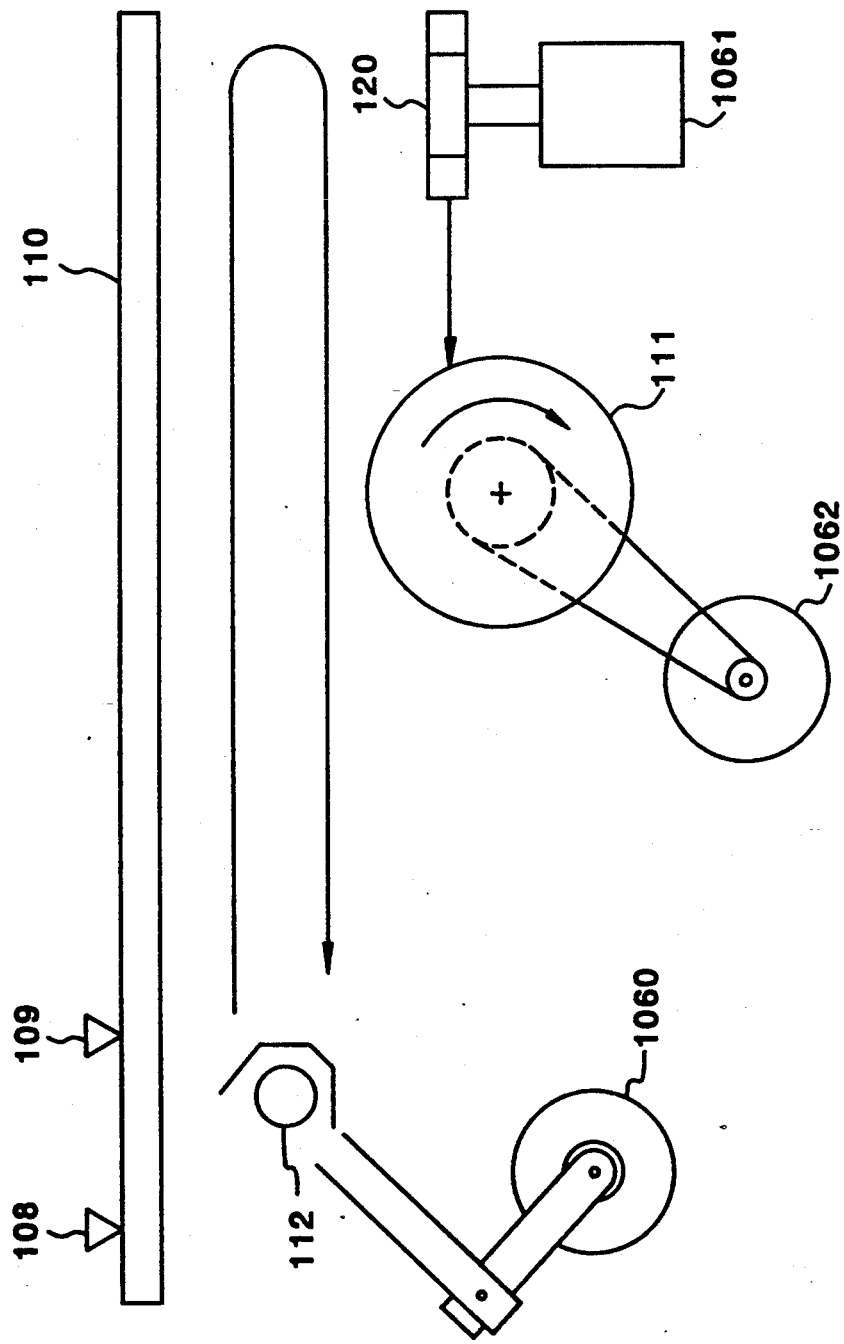
FIG. 2 is a sectional view showing the copying apparatus of the embodiment in simplified form.

FIG. 2 is a sectional view showing a copying apparatus according to an embodiment in simplified form. Numeral 110 denotes a sheet of platen glass on which a document to be copied is placed, 112 denotes an optical system having an illuminating lamp for illuminating the document, 108 denotes a home sensor for detecting that the optical system is at a home position, and 109 denotes an image end sensor for detecting that the optical system has advanced to the leading edge of the document. The sensor 109 generates a detection signal also when the optical system is moved backward. Numeral 1060 denotes a optics motor which moves the optical system 112 back and forth. Numeral 111 denotes a photosensitive drum, and 1062 denotes photosensitive body motor for rotating the photosensitive drum 111. Numeral 120 represents a polygon mirror of a hexahedron for scanning a well-known laser beam across the photosensitive drum, and numeral 1061 designates a polygon mirror motor for driving the polygon mirror 120.

FIRST EMBODIMENT

Figure 1:
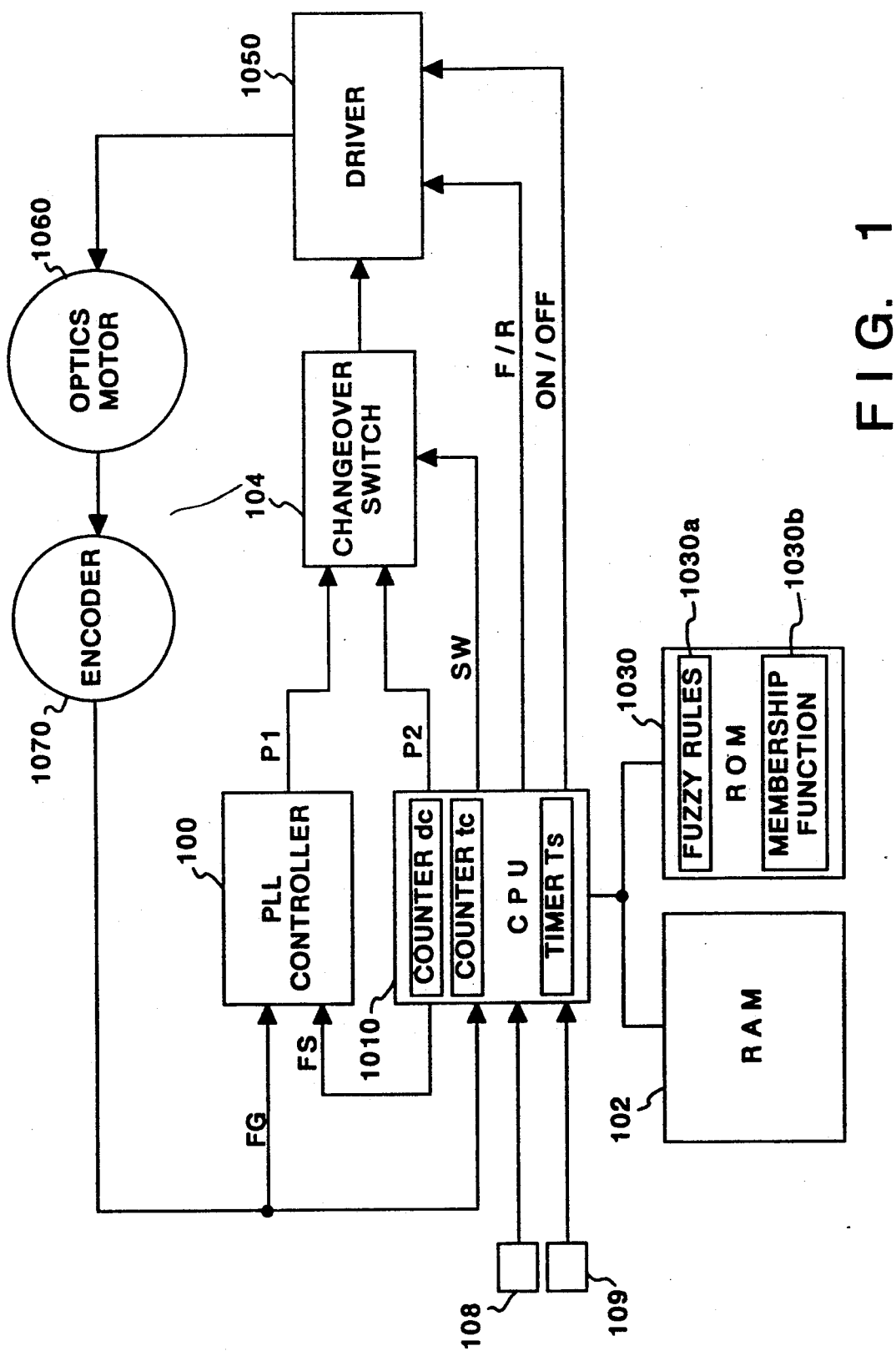
FIG. 1 is a basic block diagram showing an optics motor control section in a copying apparatus of a first embodiment.

FIG. 1 is a basic block diagram showing an optics motor control section in a copying apparatus according to a first embodiment. Numeral 1060 denotes the motor for driving the optical system 112. Forward rotation drives the optical system forward, and reverse rotation drives the optical system backward. Numeral 1050 represents a driver of the motor 1060, and 1070 designates an encoder connected to the motor 1060 for outputting a signal synchronized to rotation of the motor 1060. Numeral 100 represents a well-known PLL control unit. In a case where the motor 1060 is rotated at a desired velocity, a reference frequency FS corresponding to the desired velocity is applied to the PLL control unit 100, whereby the latter outputs a pulse-width modulated signal P1, which serves as the velocity control signal of the motor 1060, in such a manner that a phase angle between the signal FS and an encoder signal FG from the motor 1060 attains a constant value.

Numeral 1010 denotes a CPU for processing and control for performing motor velocity control in accordance with fuzzy inferential reasoning (described below), outputting the reference frequency FS necessary to perform motor velocity control by PLL, performing forward-, reverse- and stop-control by a forward-/reverse control signal F/R and drive/stop control signal ON/OFF, and performing changeover control to switch between PLL control and fuzzy control of motor velocity. The CPU 1010 has a counter $d_c$, a counter $t_c$, and a timer $T_S$. Numeral 1030 denotes a ROM which stores a program executed by the CPU 1010, fuzzy rules 1030a, described below, and membership functions 1030b, also described below. Numeral 102 denotes a RAM used as a working area when control and fuzzy inferential reasoning are performed. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1010. Numeral 108 designates the aforementioned home sensor and 109 the image edge sensor. Output signals (high/low) from these sensors both enter the CPU 1010.

EXAMPLE OF OPERATION

An example of operation for velocity control of the motor by fuzzy inferential reason according to the embodiment will now be described. The description will be given with reference to FIGS. 1 through 5.

The CPU 1010 calculates the velocity of the system 112 by counting, for a fixed period of time, the number of pulses outputted by the encoder 1070 of the motor, and calculates, as a velocity deviation, the difference between the calculated velocity and a target velocity. The CPU 1010 calculates also a distance deviation up to a target position of the system 112 by comparing a fixed number of pulses, which are needed for movement between the home position and the target position, with a number of pulses which enter from the encoder after the home position is passed.

In order to perform the fuzzy inferential reasoning, two status variable are used, namely (1) the velocity deviation between the present velocity and the target velocity, and
(2) the distance deviation between the present position and the target position.

Also, (3) a motor-velocity control variable is used as a control variable for velocity control of the system.

Figure 3A:
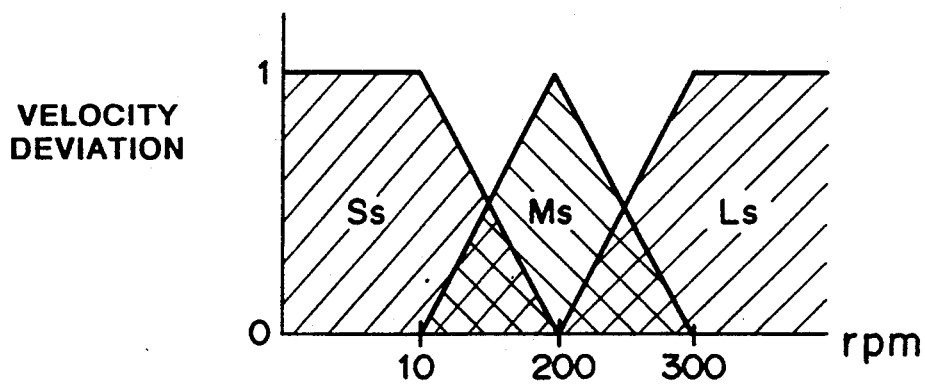
FIG. 3A is a diagram showing an example of a membership function of velocity deviation.
Figure 3B:
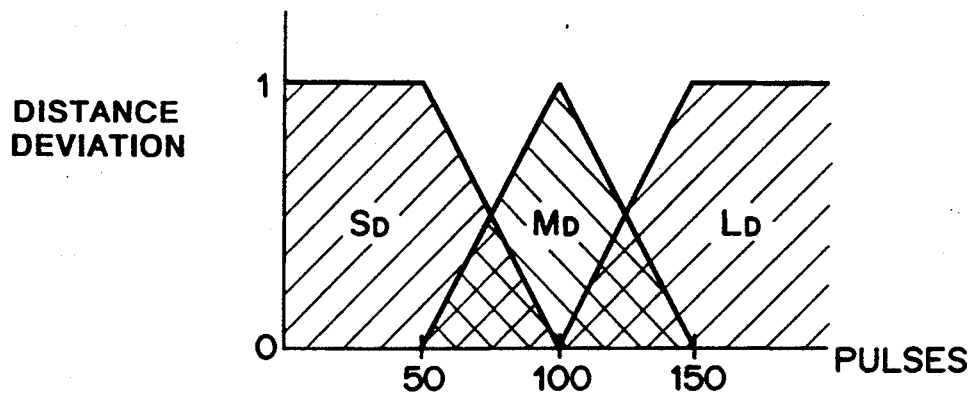
FIG. 3B is a diagram showing an example of a membership function of position deviation.
Figure 3C:
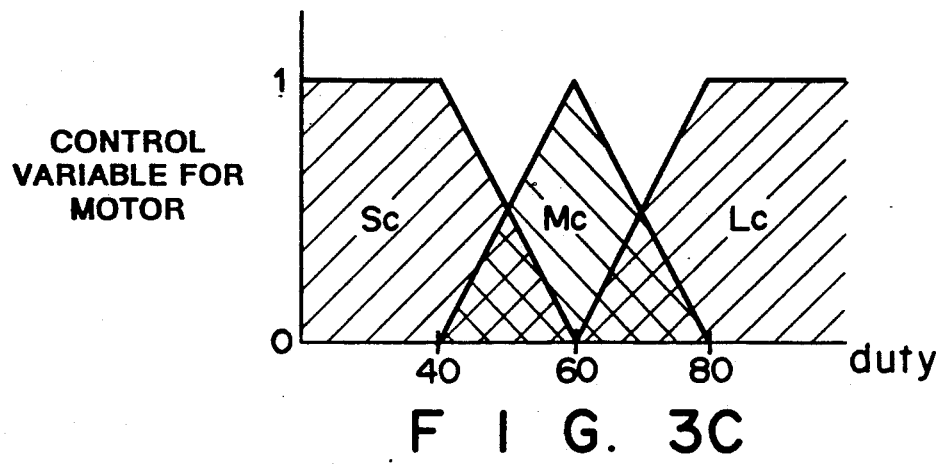
FIG. 3C is a diagram showing an example of a membership function of a control variable of a motor.

FIGS. 3A through 3C illustrate fuzzy sets referred to as membership functions of the status variables and control variable (1) through (3) mentioned above.

Velocity deviation, distance deviation and the motor control variable are classified broadly into several sets. For example, in case of the velocity deviation:

1) $S_s$... velocity deviation is small;
2) $M_s$... velocity deviation is medium;
3) $L_s$... velocity deviation is large.

In case of the distance deviation,

1) $S_d$... distance deviation is small;
2) $M_d$... distance deviation is medium;
3) $L_d$... distance deviation is large.

The membership in each of these sets is expressed by a value of 0 to 1. FIG. 3A is a membership function of the velocity deviation, FIG. 3B a membership function of the distance deviation, and FIG. 3C a membership function of the motor control variable.

A method of calculating the control variable of the motor from the velocity deviation and distance deviation will now be described. In order to decide the control variable of the motor, the following fuzzy rules are used, by way of example:

Rule 1
If velocity deviation=$L_s$ and distance deviation=$M_d$, then control variable of motor=$M_c$.

Rule 2
If velocity deviation=$M_s$ and distance deviation=$M_d$, then control variable of motor=$S_c$.

The fuzzy rules are thus set as required. FIGS. 4A and 4B are fuzzy rules used in this embodiment.

Figure 5:
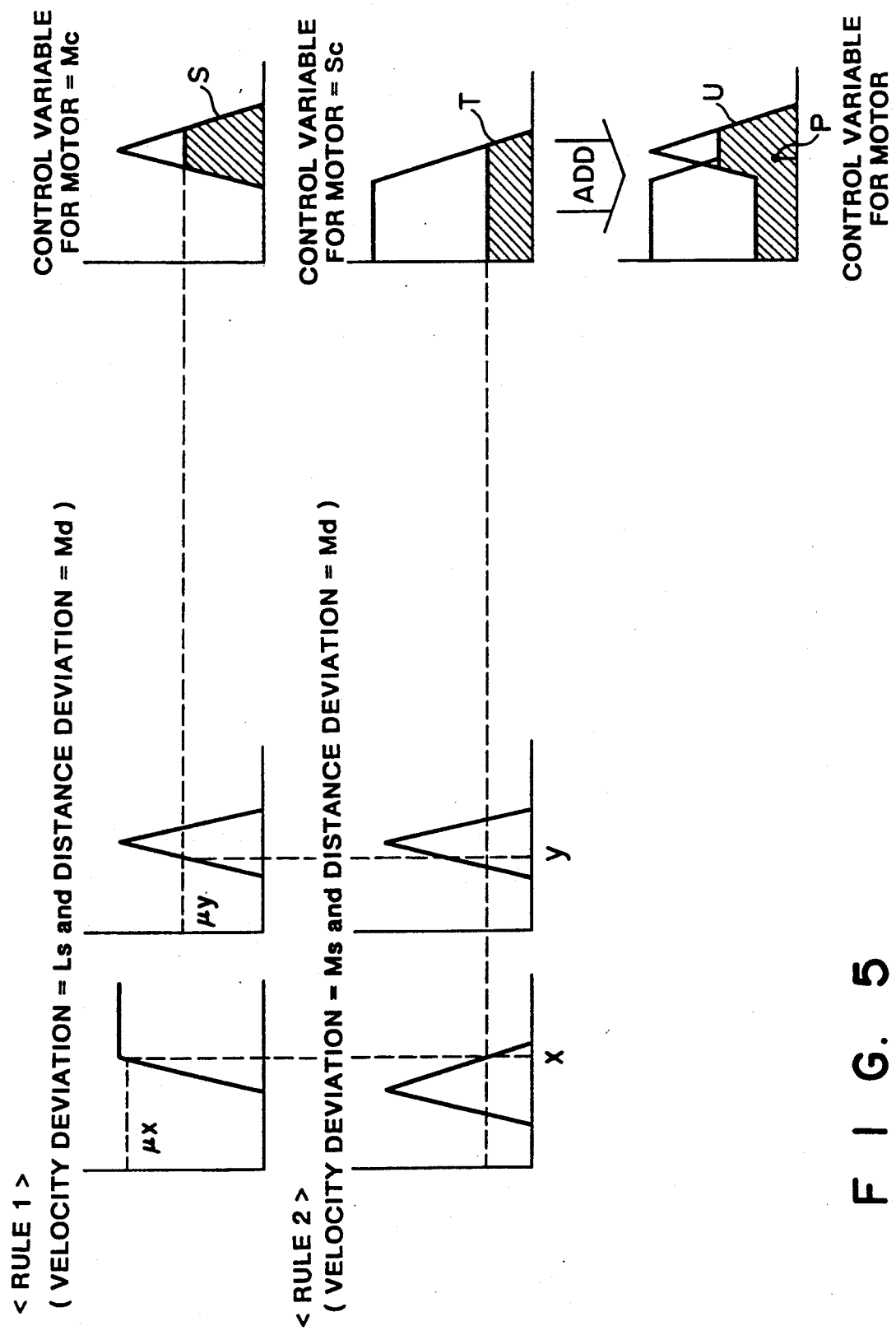
FIG. 5 is a diagram showing an example of fuzzy inferential reasoning according to the embodiment.

FIG. 5 is an example in which the control variable of the motor is calculated by fuzzy inferential reasoning using Rule 1 and Rule 2. As one example, a case will be described in which the velocity deviation=x and the distance deviation=y.

In Rule 1, input x is contained in the set of $L_s$ at the degree of $u_x$ according to the membership function of velocity deviation, and input y is contained in the set of $M_d$ at the degree of $u_y$ according to the membership function of distance deviation. Thereafter, the minimum value of $u_x$ and $u_y$ is taken and this value is adopted as the degree of membership which satisfies the conditional portion of Rule 1. When a MIN (minimum value) operation is applied to this value and the membership function Mc of the control variable of the motor, the result is the trapezoid indicated by the shaded area S. A similar computation is performed also in Rule 2 to obtain a trapezoid indicated by the shaded portion T.

Thereafter, the sum of the set of S and the set of T is taken and a new set of U, indicated by the shaded portion, is formed. The center of gravity P of this set is set as the control variable of the motor obtained by fuzzy inferential reasoning. A case where velocity deviation=$L_s$ and distance deviation=$S_d$ holds, and a case where velocity deviation=$M_s$ and distance deviation=$S_d$ holds, are not illustrated.

As described above, with regard to all fuzzy rules shown in FIG. 4, the above-described method is such that degree of membership in the fuzzy set of the control variable is calculated from the degree of membership in the fuzzy sets of the status variables in accordance with each fuzzy rule, the sum of the sets belonging to each rule is calculated, the control variable having the highest possibility is calculated by obtaining the center of gravity, and the center of gravity is set as the control variable of the motor. The motor is then controlled in dependence upon the set control variable of the optics motor. This control variable is the duty of the PWM output of the optics motor.

AT STARTING OF THE OPTICAL SYSTEM

The procedure of fuzzy inferential reasoning at starting of the optics drive motor will be described with reference to the flowcharts of FIGS. 6 and 7.

Figure 6:
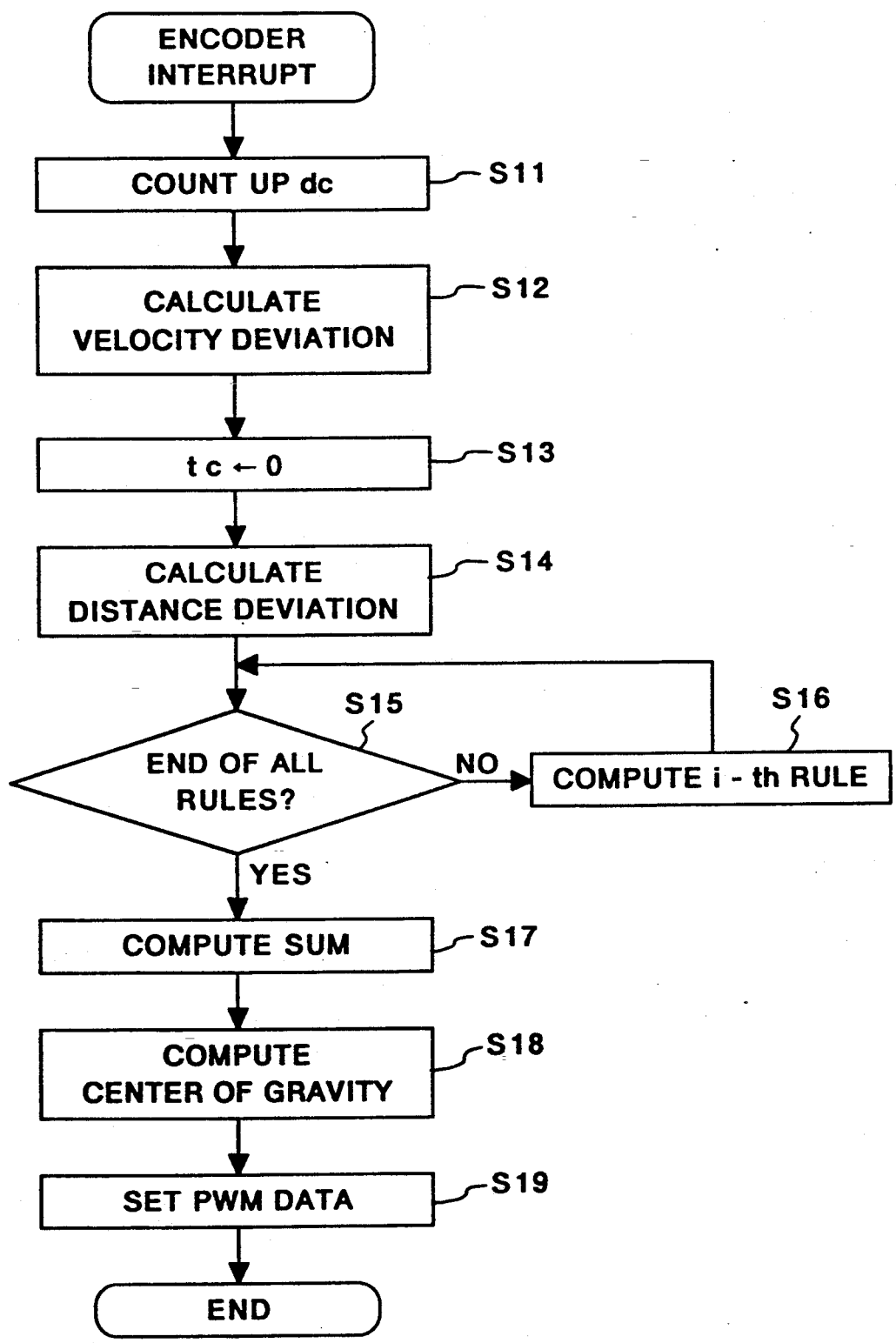
FIG. 6 is a flowchart showing the procedure of an encoder interrupt routine in the first embodiment.

The routine of FIG. 6 is executed whenever the optical system is moved a fixed distance (d) by an encoder interrupt. The encoder-interrupt routine is used until the position of the optical system reaches the edge of the image. On the other hand, an interrupt routine for time measurement is provided at step S20 in FIG. 7 separately of the main routine, and the counter $t_c$ is counted up at fixed times. The counter $t_c$ is cleared to zero at step S13 in the routine of FIG. 6. Accordingly, the traveling velocity of the optical system at this point in time is obtained from the values of the counters $d_c$, $t_c$.

First, the counter dc for the traveling distance of the optical system is counted up at step S11. Next, at step S12, the traveling velocity is obtained from the value in counter $t_c$, and the velocity deviation is computed. The counter $t_c$ is cleared to zero at step S13 when the processing of step S12 ends. The distance deviation is calculated from the value in counter $d_c$ at step S14.

Next, at steps S15 and S16, the degree of membership in the fuzzy set of the status variable regarding the traveling distance and traveling velocity is decided, and decree of membership in the fuzzy set of the control variable is obtained from this value on the basis of the newly set fuzzy rule. When this operation is ended, the program proceeds from step S15 to step S17, at which the sum of the sets belonging to each rule is calculated. The control variable having the highest possibility is calculated by obtaining the center of gravity at step S18. Next, at step S19, the center of gravity is set as PWM data for the purpose of controlling the optics drive motor.

Velocity control of the optics drive motor is changed over to PLL at the moment the traveling velocity of the optical system attains a set value.

AT REVERSAL OF THE OPTICAL SYSTEM

The procedure of fuzzy inferential reasoning at reversal of the rotating direction of the optics drive motor will be described with reference to the flowcharts of FIGS. 6 and 7.

The routine of FIG. 6 is executed whenever the optical system is moved the fixed distance (d) by the encoder interrupt. The encoder-interrupt routine is used until the velocity attains a certain set value after the traveling direction of the optical system is reversed. On the other hand, an interrupt routine for time measurement in FIG. 7 is provided separately of the main routine, and the counter $t_c$ is counted up at fixed times. The processing in each of the subsequent steps is the same as when the optical system is started.

Velocity control of the optics drive motor is changed over to PLL at the moment the traveling velocity of the optical system attains a set value.

AT STOPPING OF THE OPTICAL SYSTEM

The procedure of fuzzy inferential reasoning at stopping of the rotating direction of the optics drive motor will be described with reference to the flowcharts of FIGS. 6 and 7.

The routine of FIG. 6 is executed whenever the optical system is moved the fixed distance (d) by the encoder interrupt. The encoder-interrupt routine is used until the traveling velocity of the optical system becomes zero following receipt of an instruction for stopping the movement of the optical system. The movement of the optical system is controlled by the conventional method until the instruction for stopping the movement of the optical system is received. On the other hand, an interrupt routine for time measurement in FIG. 7 is provided separately of the main routine, and the counter $t_c$ is counted up at fixed times. With the exception of the fact that the fuzzy rule of FIG. 4B is used, the processing in each of the subsequent steps is the same as when the optical system is started and reversed. After the optical system is stopped, the system is usually started or reversed.

CHANGEOVER BETWEEN FUZZY CONTROL AND PLL CONTROL

Figure 8:
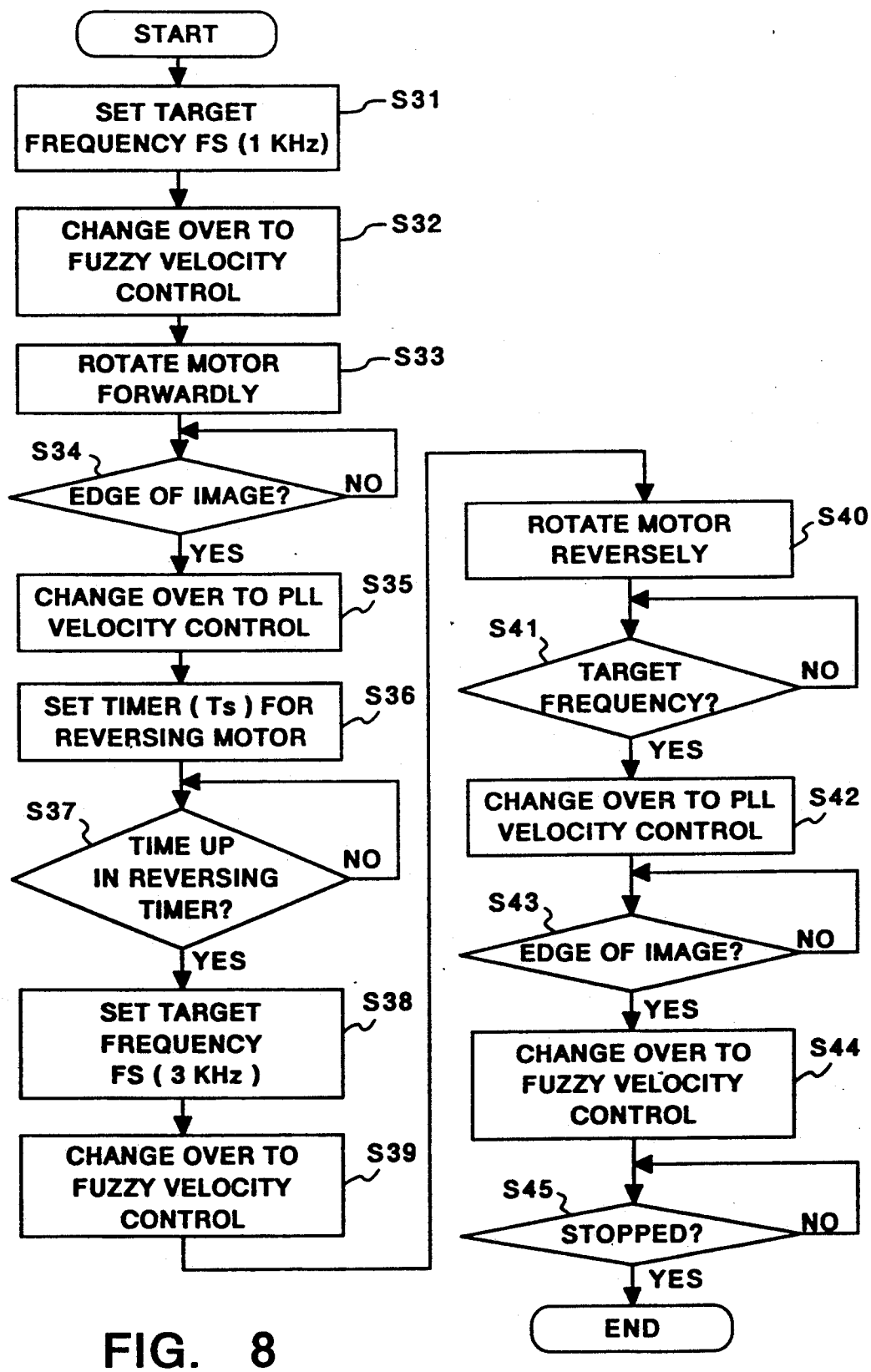
FIG. 8 is a flowchart showing the procedure of a changeover between fuzzy velocity control and PLL velocity control in the embodiment of FIG. 1.

Reference will now be made to the flowchart of FIG. 8 to describe a changeover in the velocity control of the optics drive motor by fuzzy velocity control and PLL velocity control when the optics drive motor is started, reversed and stopped.

A target frequency FS (1 KHz) corresponding to the target velocity of the optics drive motor is outputted to the PLL at step S31. Control of the velocity of the optics drive motor is changed over to fuzzy velocity control at step S32, and the optics drive motor is rotated forwardly at step S33. It is determined at step S34 whether the optical system has arrived at the leading edge of the image. If it has not arrived, then arrival at the leading edge of the image is awaited while fuzzy control is executed at step S34 whenever a predetermined distance is traversed.

Control of the velocity of the optics drive motor is changed over to PLL-velocity control at step S35, and the timer $T_s$ of the timing for reversing the optics drive motor is set at step S36. It is determined at step S37 whether time is up in the timer $T_s$. If time is up, the program proceeds to step S38; if not, time-up is awaited at step S37. At step S38, a target frequency FS (3 KHz) corresponding to a target velocity at which the optics drive motor is reversed is outputted to the PLL.

Control of the velocity of the optics drive motor is changed over to fuzzy velocity control at step S39, and the optics drive motor is rotated reversely at step S40. It is determined at step S41 whether the frequency outputted by the optics drive motor through the intermediary of the encoder is equal to the target frequency FS outputted at step S38. If the frequencies are equal, the program proceeds to step S42; if not, attainment of the target frequency is awaited while fuzzy control is executed whenever a predetermined distance is traversed.

Control of the velocity of the optics drive motor is changed over to PLL-velocity control at step S42. It is determined at step S43 whether the optical system has arrived at the leading edge of the image. If it has arrived, the program proceeds to step S44. If it has not arrived, then arrival is awaited at step S43.

Control of the velocity of the optics drive motor is changed over to fuzzy velocity control at step S44. Fuzzy velocity control is performed until the optical system stops at step S45.

OTHER APPLICATION OF FIRST EMBODIMENT

Figure 9:
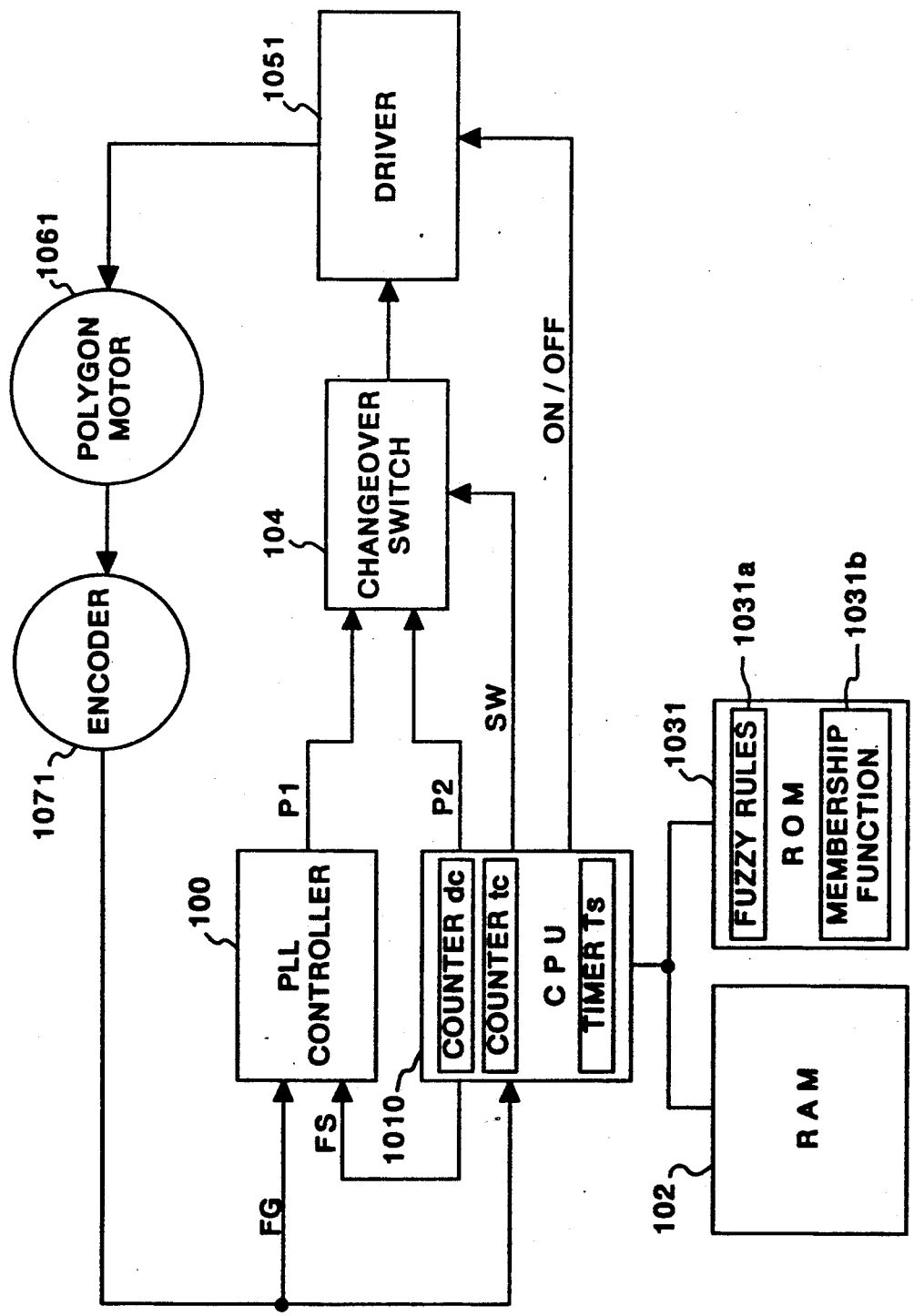
FIG. 9 is a basic block diagram of a polygon motor control section in the copying apparatus of the first embodiment.

FIG. 9 is a basic block diagram showing a polygon motor control section in a copying apparatus according to the first embodiment. Numeral 1061 denotes the motor for driving the polygon mirror 120. Numeral 1051 represents a driver of the motor 1061, and 1071 designates an encoder connected to the motor 1061 for outputting a signal synchronized to rotation of the motor 1061. Numeral 100 represents a well-known PLL control unit. In a case where the motor 1061 is rotated at a desired velocity, a reference frequency FS corresponding to the desired velocity is applied to the PLL control unit 100, whereby the latter outputs a pulse-width modulated signal P1, which serves as the velocity control signal of the motor 1061, in such a manner that a phase angle between the signal FS and an encoder signal FG from the motor 1061 attains a constant value.

Numeral 1010 denotes a CPU for processing and control for performing motor velocity control in accordance with fuzzy inferential reasoning (described below), outputting the reference frequency FS necessary to perform motor velocity control by PLL, performing forward-, reverse- and stop-control by a forward-/reverse control signal F/R and drive/stop control signal ON/OFF, and performing changeover control to switch between PLL control and fuzzy control of motor velocity. The CPU 1010 has a counter $d_c$, a counter $t_c$, and a timer $T_s$. Numeral 1031 denotes a ROM which stores a program executed by the CPU 1010, fuzzy rules 1031a, described below, and membership functions 1031b, also described below. Numeral 102 denotes a RAM used as a working area when control and fuzzy inferential reasoning are performed. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1010.

In this embodiment, when copying is performed at the same magnification and in enlarged size, the rotational speed of the motor 1062 for driving the photosensitive drum is 180 rpm, the rotational speed of the motor 1061 for driving the polygon mirror is 8600 rpm, and the reference frequency FS is 1 KHz. When copying is performed in reduced size, the rotational speed of the motor 1062 for driving the photosensitive drum is 130 rpm, the rotational speed of the motor 1061 for driving the polygon mirror is 6200 rpm, and the reference frequency FS is 722 Hz.

EXAMPLE OF OPERATION

An example of operation for velocity control of the polygon motor by fuzzy inferential reason according to the embodiment will now be described. In this example, the control variable of polygon motor velocity, namely the duty of the PWM output of the polygon motor, is used as the control variable instead of optics motor velocity, described above. With the exception of the membership functions of the control variable of the polygon motor, which are similar to those of FIG. 3C, the method of fuzzy inferential reasoning is the same and is not described again.

AT STARTING OF THE POLYGON MOTOR

The procedure of fuzzy inferential reasoning at starting of the polygon mirror drive motor will be described with reference to the flowcharts of FIGS. 6 and 7.

The routine of FIG. 6 is executed whenever the polygon motor is moved a fixed distance (d) by an encoder interrupt. The encoder-interrupt routine is used until the polygon motor attains a target velocity. On the other hand, an interrupt routine for time measurement is provided at step S20 in FIG. 7 separately of the main routine, and the counter $t_c$ is counted up at fixed times. The counter $t_c$ is cleared to zero at step S13 in the routine of FIG. 6. Accordingly, the rotational velocity of the polygon motor at this point in time is obtained from the values of the counters $d_c$, $t_c$.

First, the counter $d_c$ is counted up at step S11. Next, at step S12, the rotational velocity is obtained from the value in counter $t_c$, and the velocity deviation is computed. The counter $t_c$ is cleared to zero at step S13 when the processing of step S12 ends. The distance deviation is calculated from the value in counter $d_c$ at step S14.

Next, at steps S15 and S16, the degree of membership in the fuzzy set of the status variable regarding the traveling distance and traveling velocity is decided, and decree of membership in the fuzzy set of the control variable is obtained from this value on the basis of the fuzzy rules of FIG. 4A. When this operation is ended with regard to all rules to be considered, the program proceeds from step S15 to step S17, at which the sum of the sets belonging to each rule is calculated. The control variable having the highest possibility is calculated by obtaining the center of gravity at step S18. Next, at step S19, the center of gravity is set as PWM data for the purpose of controlling the polygon mirror drive motor.

Velocity control of the polygon mirror drive motor is changed over to PLL at the moment the rotational velocity of the polygon motor attains a set value.

AT SPEED CHANGE OF THE POLYGON MOTOR

The procedure of fuzzy inferential reasoning at a change in the rotational velocity of the polygon mirror drive motor will be described with reference to the flowcharts of FIGS. 6 and 7.

The routine of FIG. 6 is executed whenever the polygon motor is moved the fixed distance (d) by the encoder interrupt. The encoder-interrupt routine is used until the rotational velocity attains a certain set value (2nd speed) upon receipt of an instruction for changing the speed of the polygon motor. On the other hand, an interrupt routine for time measurement in FIG. 7 is provided separately of the main routine, and the counter $t_c$ is counted up at fixed times. The processing in each of the subsequent steps is the same as when the polygon motor is started except that the fuzzy rules of FIG. 4A are used at acceleration and the fuzzy rules of FIG. 4B at deceleration.

Velocity control of the polygon mirror drive motor is changed over to PLL at the moment the rotational velocity of the polygon motor attains a set value.

CHANGEOVER BETWEEN FUZZY CONTROL AND PLL CONTROL

Figure 10:
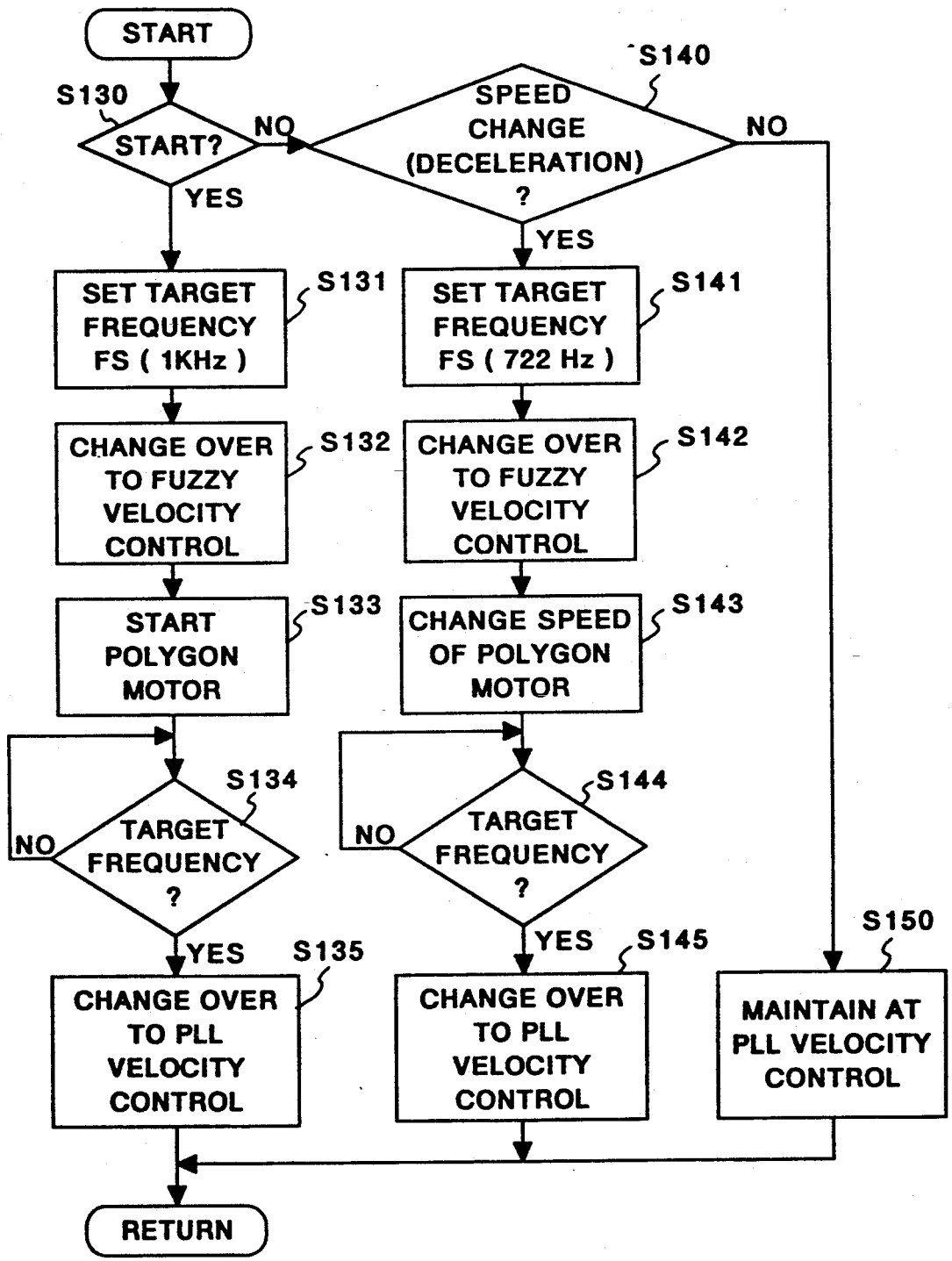
FIG. 10 is a flowchart showing the procedure of a changeover between fuzzy velocity control and PLL velocity control in the embodiment of FIG. 9.

Reference will now be made to the flowchart of FIG. 10 to describe a changeover in the velocity control of the polygon mirror drive motor by fuzzy velocity control and PLL velocity control when the polygon mirror drive motor is started and changed in speed.

First, it is determined at steps S130 and S140 whether the motor is being started or changed in speed. If the motor is stated, the program proceeds from step 130 to step 131, at which a target frequency FS (1 KHz) corresponding to the target velocity of the polygon motor is outputted to the PLL. Control of the velocity of the polygon motor is changed over to fuzzy velocity control at step S132, and the polygon motor is rotated at step S33. It is determined at step S134 whether the polygon motor has attained the target velocity. If it has not, then attainment of the target velocity is awaited while fuzzy control is executed at step S134 whenever a predetermined angle is traversed. Control of the polygon motor velocity is changed over to PLL velocity control at step S135.

When speed is changed, the program proceeds from step S140 to step S141, at which the target frequency FS (722 Hz) corresponding to the target velocity of the polygon motor is outputted to the PLL. Control of the polygon motor velocity is changed over to fuzzy velocity control at step S142. The polygon motor is decelerated at step S143. It is determined at step S144 whether the polygon motor has attained the target velocity. If it has not, then attainment of the target velocity is awaited while fuzzy control is executed at step S144 whenever a predetermined angle is traversed. Control of the polygon motor velocity is changed over to PLL velocity control at step S145.

Control by the PLL is continued at step S150 if the polygon motor is neither started nor changed in speed.

SECOND EMBODIMENT

Figure 11:
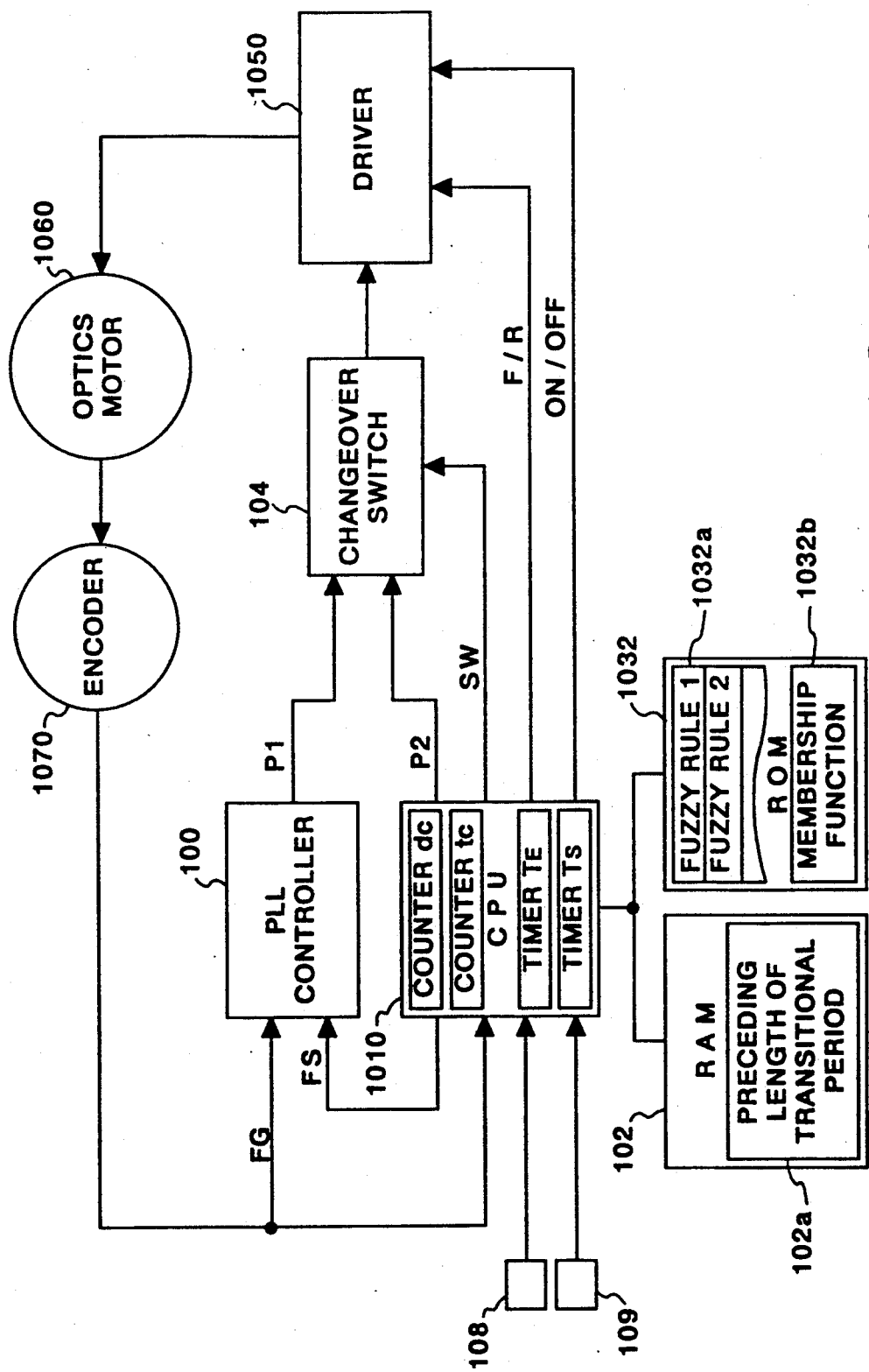
FIG. 11 is a basic block diagram of an optics motor control section in the copying apparatus of the second embodiment.

FIG. 11 is a basic block diagram showing an optics motor control section in a copying apparatus according to a first embodiment. Numeral 1060 denotes the motor for driving the optical system 112. Forward rotation drives the optical system forward, and reverse rotation drives the optical system backward. Numeral 1050 represents a driver of the motor 1060, and 1070 designates an encoder connected to the motor 1060 for outputting a signal synchronized to rotation of the motor 1060. Numeral 100 represents a well-known PLL control unit. In a case where the motor 1060 is rotated at a desired velocity, a reference frequency FS corresponding to the desired velocity is applied to the PLL control unit 100, whereby the latter outputs a pulse-width modulated signal P1, which serves as the velocity control signal of the motor 1060, in such a manner that a phase angle between the signal FS and an encoder signal FG from the motor 1060 attains a constant value.

Numeral 1011 denotes a CPU for processing and control for performing motor velocity control in accordance with fuzzy inferential reasoning (described below), outputting the reference frequency FS necessary to perform motor velocity control by PLL, performing forward-, reverse- and stop-control by a forward-/reverse control signal F/R and drive/stop control signal ON/OFF, and performing changeover control to switch between PLL control and fuzzy control of motor velocity. The CPU 1011 has a counter $d_c$, a counter $t_c$, a timer $T_s$ and a timer $T_E$. Numeral 1032 denotes a ROM which stores a program executed by the CPU 1011, fuzzy rules 1032a, described below, and membership functions 1032b, also described below. The fuzzy rules 1032a include a plurality of fuzzy rules such as a Fuzzy Rule 1, Fuzzy Rule 2, ... etc. Numeral 102 denotes a RAM used as a working area when control and fuzzy inferential reasoning are performed. The RAM 102 has a time area 102a for storing the length of transitional period of fuzzy control of the last cycle. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1011. Numeral 108 designates the aforementioned home sensor and 109 the image edge sensor. Output signals (high/low) from these sensors both enter the CPU 1011.

EXAMPLE OF OPERATION

An example of operation for velocity control of the optics motor by fuzzy inferential reason according to the embodiment will now be described. The method of fuzzy inferential reasoning is the same as in the foregoing embodiment and is not described again.

FIGS. 12A and 12B are fuzzy rules used in the present embodiment. Here the fuzzy rules are of two types, namely an "ordinary rule" and a "post-correction rule".

AT STARTING OF THE OPTICAL SYSTEM

The procedure of fuzzy inferential reasoning at starting of the optics drive motor will be described with reference to the flowcharts of FIGS. 13 and 7. It should be noted that reference characters in FIG. 13 that are identical with those in FIG. 6 indicate similar processing.

Figure 13:
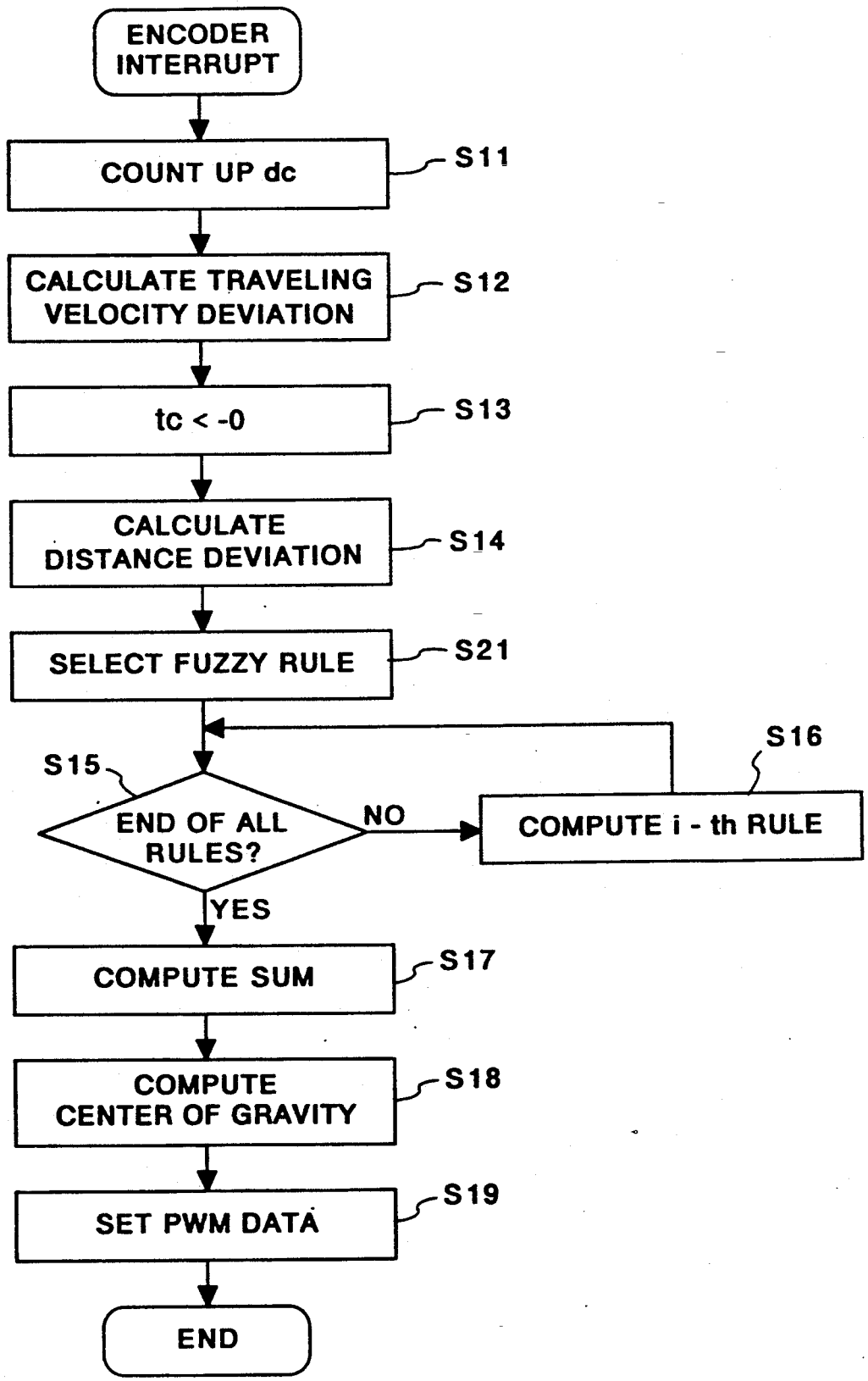
FIG. 13 is a flowchart showing the procedure of an encoder interrupt routine in the second embodiment.

The routine of FIG. 13 is executed whenever the optical system is moved a fixed distance (d) by an encoder interrupt. The encoder-interrupt routine is used until the position of the optical system reaches the edge of the image. On the other hand, an interrupt routine for time measurement is provided at step S20 in FIG. 7 separately of the main routine, and the counter $t_c$ is counted up at fixed times. The counter $t_c$ is cleared to zero at step S13 in the routine of FIG. 13. Accordingly, the traveling velocity of the optical system at this point in time is obtained from the values of the counters $d_c$, $t_c$.

First, the counter $d_c$ for the traveling distance of the optical system is counted up at step S11. Next, at step S12, the traveling velocity is obtained from the value in counter $t_c$, and the velocity deviation is computed. The counter $t_c$ is cleared to zero at step S13 when the processing of step S12 ends. The distance deviation is calculated from the value in counter $d_c$ at step S14.

Next, at step S21, on the basis of length of transitional period at the start of the optics drive motor in the last preceding cycle (the time from starting of the motor until the end of control by fuzzy inferential reasoning), control is performed using the "ordinary rule" of FIG. 12A when the length of transitional period at the start in the last preceding cycle is, e.g., less than 200 msec, and using the "post-correction rule" of FIG. 12A when the length of transitional period at the start in the last preceding cycle is greater than 200 msec.

Next, at steps S15 and S16, the degree of membership in the fuzzy set of the status variable regarding the traveling distance and traveling velocity is decided, and degree of membership in the fuzzy set of the control variable is obtained from this value on the basis of the newly set fuzzy rule. When this operation is ended with regard to all rules to be considered, the program proceeds from step S15 to step S17, at which the sum of the sets belonging to each rule is calculated. The control variable having the highest possibility is calculated by obtaining the center of gravity at step S18. Next, at step S19, the center of gravity is set as PWM data for the purpose of controlling the optics drive motor.

Velocity control of the optics drive motor is changed over to PLL at the moment the traveling velocity of the optical system attains a set value. At the same time, the length of transitional period from the start of the optics drive motor up to this point in time is stored. This value is referred to at correction of the fuzzy rule in the next cycle.

AT REVERSAL OF THE OPTICAL SYSTEM

The procedure of fuzzy inferential reasoning at reversal of the rotating direction of the optics drive motor will be described with reference to the flowcharts of FIGS. 13 and 7.

The routine of FIG. 13 is executed whenever the optical system is moved the fixed distance (d) by the encoder interrupt. The encoder-interrupt routine is used until the velocity attains a certain set value after the traveling direction of the optical system is reversed. On the other hand, an interrupt routine for time measurement in FIG. 7 is provided separately of the main routine, and the counter $t_c$ is counted up at fixed times. The processing in each of the subsequent steps is the same as when the optical system drive motor is started. At the time of reversal, on the basis of length of transitional period at the reversal of the optics drive motor in the last preceding cycle (the time from reversal of the motor until the traveling velocity of the optical system attains a predetermined value), control is performed using the "ordinary rule" of FIG. 12A when the length of transitional period at the reversal in the last cycle is, e.g., less than 300 msec, and using the "post-correction rule" of FIG. 12A when the length of transitional period at the start in the last preceding cycle is greater than 300 msec.

Velocity control of the optics drive motor is changed over to PLL at the moment the traveling velocity of the optical system attains a set value. At the same time, the length of transitional period from the reversal of the optics drive motor up to this point in time is stored. This value is referred to at correction of the above-mentioned fuzzy rule.

AT STOPPING OF THE OPTICAL SYSTEM

The procedure of fuzzy inferential reasoning at stopping of the rotating direction of the optics drive motor will be described with reference to the flowcharts of FIGS. 13 and 7.

The routine of FIG. 13 is executed whenever the optical system is moved the fixed distance (d) by the encoder interrupt. The encoder-interrupt routine is used until the traveling velocity of the optical system becomes zero following receipt of an instruction for stopping the movement of the optical system. The movement of the optical system is controlled by the conventional method until the instruction for stopping the movement of the optical system is received. On the other hand, an interrupt routine for time measurement in FIG. 7 is provided separately of the main routine, and the counter $t_c$ is counted up at fixed times. The processing in each of the subsequent steps is the same as when the optical system drive motor is started and reversed. At the time of stopping, on the basis of length of transitional period for braking at the stop of the optics drive motor in the last preceding cycle (the time from receipt of the motor-stop instruction until the traveling velocity of the optical system becomes zero), control is performed using the "ordinary rule" of FIG. 12B when the length of transitional period for braking in the last preceding cycle is, e.g., less than 150 msec, and using the "post-correction rule" of FIG. 12B when the length of transitional period for braking in the last preceding cycle is greater 150 msec.

If the traveling velocity of the optical system reaches zero, the time from receipt of the motor-stop instruction up to this point in time is stored. This value is referred to at correction of the above-mentioned fuzzy rule. After the optical system is stopped, the system is usually started or reversed.

CHANGEOVER BETWEEN FUZZY CONTROL AND PLL CONTROL

Figure 14:
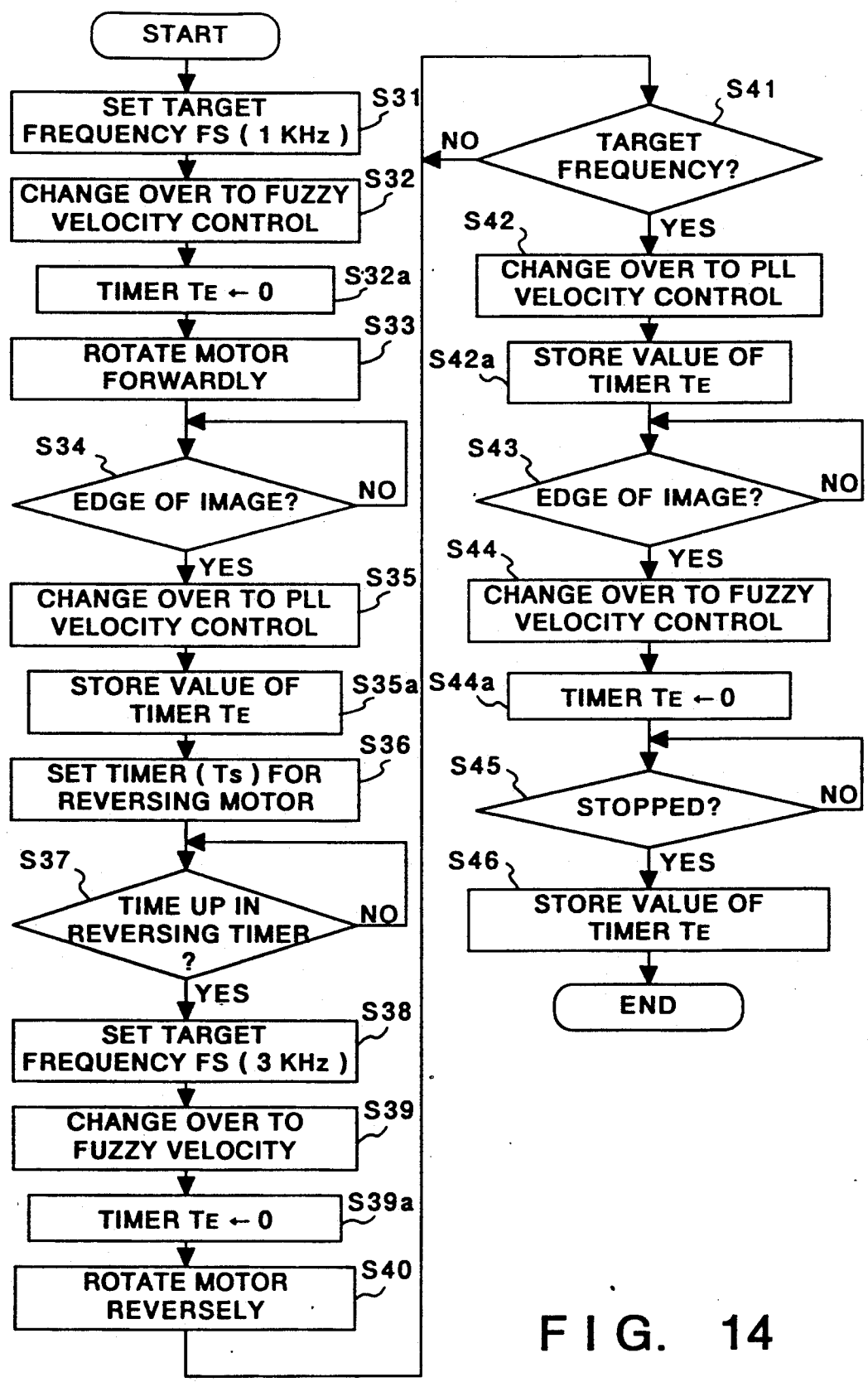
FIG. 14 is a flowchart showing the procedure of a changeover between fuzzy velocity control and PLL velocity control in the embodiment of FIG. 11.

Reference will now be made to the flowchart of FIG. 14 to describe a changeover in the velocity control of the optics drive motor by fuzzy velocity control and PLL velocity control when the optics drive motor is started, reversed and stopped. Portions in FIG. 14 identical with those shown in FIG. 8 indicate similar processing.

A target frequency FS (1 KHz) corresponding to the target velocity of the optics drive motor is outputted to the PLL at step S31. Control of the velocity of the optics drive motor is changed over to fuzzy velocity control at step S32 and, at the same time, the timer $T_E$ is cleared to zero at step S32a. The optics drive motor is rotated forwardly at step S33. It is determined at step S34 whether the optical system has arrived at the leading edge of the image. If it has not arrived, then arrival at the leading edge of the image is awaited while fuzzy control is executed at step S34 whenever a predetermined distance is traversed.

Control of the velocity of the optics drive motor is changed over to PLL-velocity control at step S35 and, at step S35a, the value in the timer $T_E$ is stored as the length of transitional period in the last preceding cycle at the time of motor drive. The timer $T_s$ of the timing for reversing the optics drive motor is set at step S36. It is determined at step S37 whether time is up in the timer $T_s$. If time is up, the program proceeds to step S38; if not, time-up is awaited at step S37. At step S38, a target frequency FS (3 KHz) corresponding to a target velocity at which the optics drive motor is reversed is outputted to the PLL.

Control of the velocity of the optics drive motor is changed over to fuzzy velocity control at step S39 and, at step S39a, the timer $T_E$ is cleared to zero. The optics drive motor is rotated reversely at step S40. It is determined at step S41 whether the frequency outputted by the optics drive motor through the intermediary of the encoder is equal to the target frequency FS outputted at step S38. If the frequencies are equal, the program proceeds to step S42; if not, attainment of the target frequency is awaited while fuzzy control is executed whenever a predetermined distance is traversed.

Control of the velocity of the optics drive motor is changed over to PLL-velocity control at step S42 and, at step S42a, the value in the timer $T_E$ is stored as the length of transitional period in the last preceding cycle at the time of reversal. It is determined at step S43 whether the optical system has arrived at the leading edge of the image. If it has arrived, the program proceeds to step S44. If it has not arrived, then arrival is awaited at step S43.

Control of the velocity of the optics drive motor is changed over to fuzzy velocity control at step S44 and, at step S44a, the timer $T_E$ is cleared to zero. Fuzzy velocity control is performed until the optical system stops at step S45. When the optical system stops, the value in the timer $T_E$ is stored as the last preceding length of transitional period at the time of stopping.

OTHER APPLICATION OF SECOND EMBODIMENT

Figure 15:
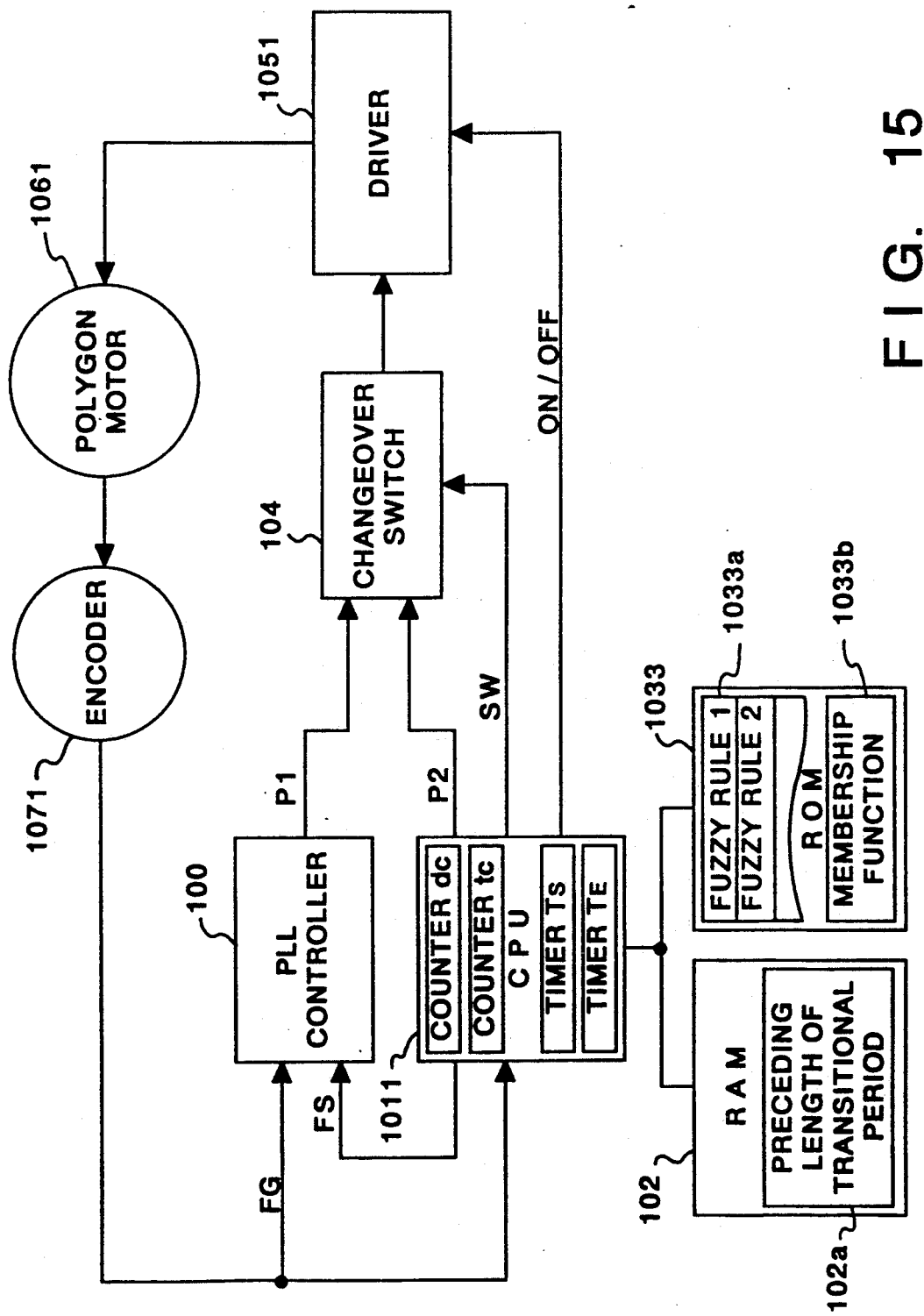
FIG. 15 is a basic block diagram of a polygon motor control section in the copying apparatus of the second embodiment.

FIG. 15 is a basic block diagram showing a polygon motor control section in a copying apparatus according to the first embodiment. Numeral 1061 denotes the motor for driving the polygon mirror 120. Numeral 1051 represents a driver of the motor 1061, and 1071 designates an encoder connected to the motor 1061 for outputting a signal synchronized to rotation of the motor 1061. Numeral 100 represents a well-known PLL control unit. In a case where the motor 1061 is rotated at a desired velocity, a reference frequency FS corresponding to the desired velocity is applied to the PLL control unit 100, whereby the latter outputs a pulse-width modulated signal P1, which serves as the velocity control signal of the motor 1061, in such a manner that a phase angle between the signal FS and an encoder signal FG from the motor 1061 attains a constant value.

Numeral 1011 denotes a CPU for processing and control for performing motor velocity control in accordance with fuzzy inferential reasoning (described below), outputting the reference frequency FS necessary to perform motor velocity control by PLL, performing forward-, reverse- and stop-control by a forward-/reverse control signal F/R and drive/stop control signal ON/OFF, and performing changeover control to switch between PLL control and fuzzy control of motor velocity. The CPU 1010 has a counter $d_c$, a counter $t_c$, a timer $T_s$ and a timer $T_E$. Numeral 1033 denotes a ROM which stores a program executed by the CPU 1011, fuzzy rules 1033a, described below, and membership functions 1033b, also described below. The fuzzy rules 1033a include a plurality of fuzzy rules such as a Fuzzy Rule 1, Fuzzy Rule 2, ... etc. Numeral 102 denotes a RAM used as a working area when control and fuzzy inferential reasoning are performed. The RAM 102 has a time area 102a for storing the length of transitional period of fuzzy control of the last cycle. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1011.

EXAMPLE OF OPERATION

The method of fuzzy inferential reasoning applied to the polygon motor in this embodiment is the same as in the foregoing embodiment and therefore is not described again. In this example, the duty of the PWM output of the polygon motor is used as the control variable of the polygon motor.

AT STARTING OF THE POLYGON MOTOR

Figure 7:
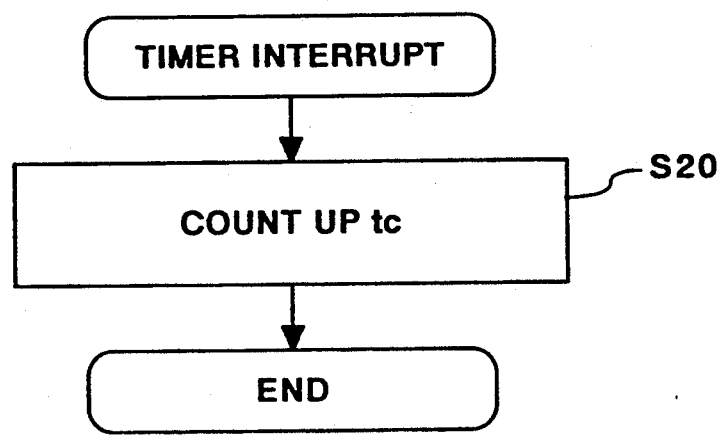
FIG. 7 is a flowchart showing the procedure of a timer interrupt routine in the present embodiment.

The control procedure is substantially similar to that for the aforementioned optics motor illustrated in FIGS. 13 and 7. However, the method of using the fuzzy rules in step S21 is different.

Next, at step S21, on the basis of length of transitional period at the start of the polygon motor in the last preceding cycle (the time from starting of the motor until the end of control by fuzzy inferential reasoning), control is performed using the "ordinary rule" of FIG. 12A when the length of transitional period at the start in the last preceding cycle is, e.g., less than 400 msec, and using the "post-correction rule" of FIG. 12A when the length of transitional period at the start in the last preceding cycle is greater than 400 msec.

Next, at steps S15 and S16, the degree of membership in the fuzzy set of the status variable regarding the traveling distance and traveling velocity is decided, and decree of membership in the fuzzy set of the control variable is obtained from this value on the basis of the fuzzy rule of FIG. 4A. When this operation is ended with regard to all rules to be considered, the program proceeds from step S15 to step S17, at which the sum of the sets belonging to each rule is calculated. The control variable having the highest possibility is calculated by obtaining the center of gravity at step S18. Next, at step S19, the center of gravity is set as PWM data for the purpose of controlling the polygon mirror drive motor.

Velocity control of the polygon mirror drive motor is changed over to PLL at the moment the rotational velocity of the polygon mirror attains a set value. At the same time, the length of transitional period from start of the polygon motor up to this point in time is stored. This value is referred to at correction of the fuzzy rule in the next cycle.

AT SPEED CHANGE OF THE POLYGON MOTOR

The processing is the same as when the polygon motor is started except that the fuzzy rules of FIG. 12A are used at acceleration and the fuzzy rules of FIG. 12B at deceleration. When the speed is changed, control is performed using the "ordinary rule" of FIG. 12A (or FIG. 12B) when the length of transitional period at the speed change in the last preceding cycle is, e.g., less than 300 msec, and using the "post-correction rule" of FIG. 12A (or FIG. 12B) when the length of transitional period at the speed change in the last preceding cycle is greater than 300 msec. This is based on the length of transitional period at the speed change when the speed of the polygon motor is changed in the last preceding cycle (the time from the start of the speed change of the motor until the rotational velocity of the polygon motor attains the target value).

Velocity control of the polygon mirror drive motor is changed over to PLL at the moment the rotational velocity of the polygon mirror attains a set value. At the same time, the length of transitional period from start of the speed change of the polygon motor up to this point in time is stored. This value is referred to at correction of the fuzzy rule in the next cycle.

CHANGEOVER BETWEEN FUZZY CONTROL AND PLL CONTROL

Reference will now be made to the flowchart of FIG. 16 to describe a changeover in the velocity control of the polygon mirror drive motor by fuzzy velocity control and PLL velocity control when the polygon mirror drive motor is started and changed in speed. Portions in FIG. 16 identical with those shown in FIG. 10 indicate similar processing.

First, it is determined at steps S130 and S140 whether this is the time for starting the motor or changing the speed of the motor. If the time is that for starting the motor, the program proceeds from step S130 to step S131, at which a target frequency FS (1 KHz) corresponding to the target velocity of the polygon motor is outputted to the PLL. Control of the velocity of the polygon motor is changed over to fuzzy velocity control at step S132 and, at step 132a, the timer $T_E$ is cleared to zero. The polygon motor is rotated at step S133. It is determined at step S134 whether the polygon motor has attained the target velocity. If it has not, then attainment of the target velocity is awaited while fuzzy control is executed at step S134 whenever a predetermined angle is traversed. Control of the polygon motor velocity is changed over to PLL velocity control at step S135, and the value in timer $T_E$ is stored as the length of transitional period of the last preceding cycle at step S135a.

If speed is changed, the program proceeds from step S140 to step S141, at which the target frequency FS (722 Hz) corresponding to the target velocity of the polygon motor is outputted to the PLL. Control of the polygon motor velocity is changed over to fuzzy velocity control at step S142 and the timer $T_E$ is cleared to zero at step S142a. The polygon motor is decelerated at step S143. It is determined at step S144 whether the polygon motor has attained the target velocity. If it has not, then attainment of the target velocity is awaited while fuzzy control is executed at step S144 whenever a predetermined angle is traversed. Control of the polygon motor velocity is changed over to PLL velocity control at step S145, and the value in timer $T_E$ is stored as the length of transitional period of the last preceding cycle at step 145a.

Control by the PLL is continued at step S150 if the polygon motor is neither started nor changed in speed.

FURTHER APPLICATION OF SECOND EMBODIMENT

Figure 17:
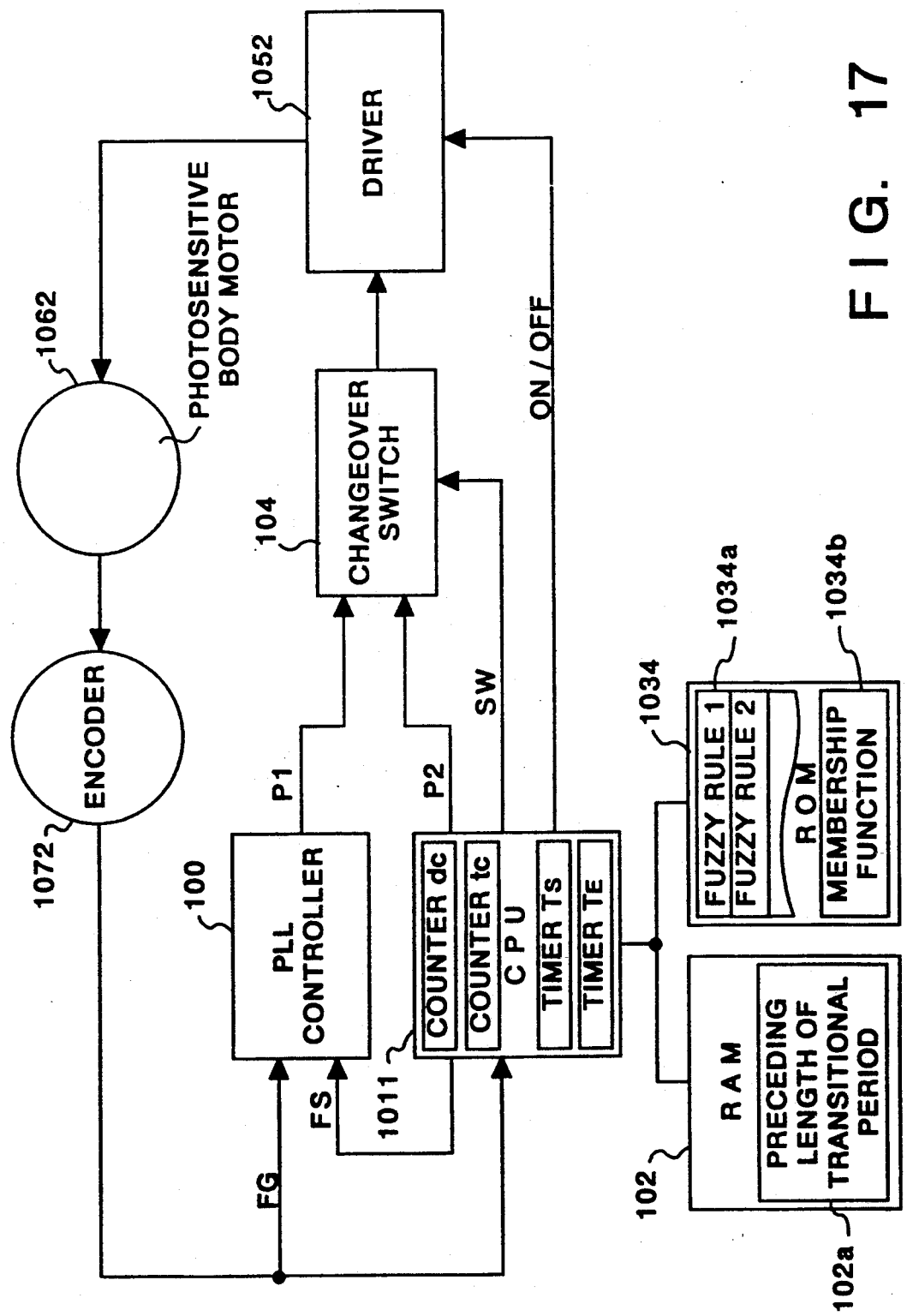
FIG. 17 is a basic block diagram of a photosensitive body drive motor control section in the copying apparatus of the second embodiment.

FIG. 17 is a basic block diagram showing a photosensitive body drive motor control section in the copying apparatus according to the second embodiment. Numeral 1062 denotes the motor for driving the photosensitive body 111. Numeral 1052 represents a driver of the motor 1062, and 1072 designates an encoder connected to the motor 1062 for outputting a signal synchronized to rotation of the motor 1062. Numeral 100 represents a well-known PLL control unit. In a case where the motor 1062 is rotated at a desired velocity, a reference frequency FS corresponding to the desired velocity is applied to the PLL control unit 100, whereby the latter outputs a pulse-width modulated signal P1, which serves as the velocity control signal of the motor 1062, in such a manner that a phase angle between the signal FS and an encoder signal FG from the motor 1062 attains a constant value.

Numeral 1011 denotes a CPU for processing and control for performing motor velocity control in accordance with fuzzy inferential reasoning (described below), outputting the reference frequency FS necessary to perform motor velocity control by PLL, performing forward-, reverse- and stop-control by a forward-/reverse control signal F/R and drive/stop control signal ON/OFF, and performing changeover control to switch between PLL control and fuzzy control of motor velocity. The CPU 1011 has a counter $d_c$, a counter $t_c$, a timer $T_S$ and a timer $T_E$. Numeral 1034 denotes a ROM which stores a program executed by the CPU 1011, fuzzy rules 1034a, described below, and membership functions 1034b, also described below. The fuzzy rules 1034a include a plurality of fuzzy rules such as a Fuzzy Rule 1, Fuzzy Rule 2, ... etc. Numeral 102 denotes a RAM used as a working area when control and fuzzy inferential reasoning are performed. The RAM 102 has a time area 102a for storing the length of transitional period of fuzzy control of the last cycle. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1011.

EXAMPLE OF OPERATION

The Procedure for Controlling

Figure 16:
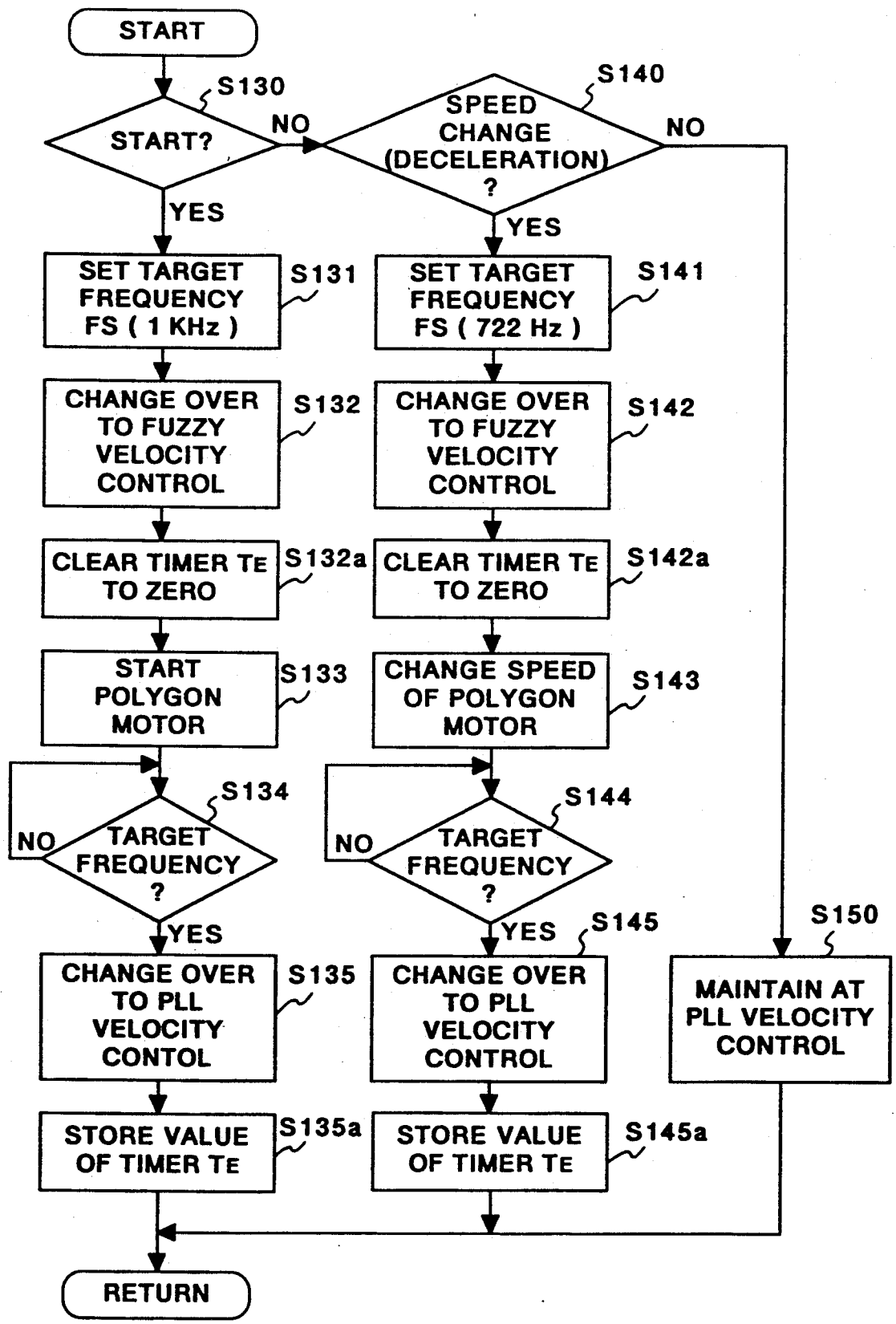
FIG. 16 is a flowchart showing the procedure of a changeover between fuzzy velocity control and PLL velocity control in the embodiment of FIG. 15 or 17.

The operation of this embodiment is similar to the procedure for controlling the polygon mirror drive motor (FIGS. 13, 7 and 16). Only the rotational velocity (rpm) in this control is different.

In this embodiment, when copying is performed at the same magnification and in enlarged size, the rotational speed of the motor for driving the photosensitive drum is 180 rpm, and the reference frequency FS is 1 KHz. When copying is performed in reduced size, the rotational speed of the motor for driving the photosensitive drum is 130 rpm, and the reference frequency FS is 722 Hz. It should be noted that this motor drives not only the photosensitive drum but also the paper feed and conveyance system of the copying apparatus, though this is not illustrated.

THIRD EMBODIMENT

Figure 18:
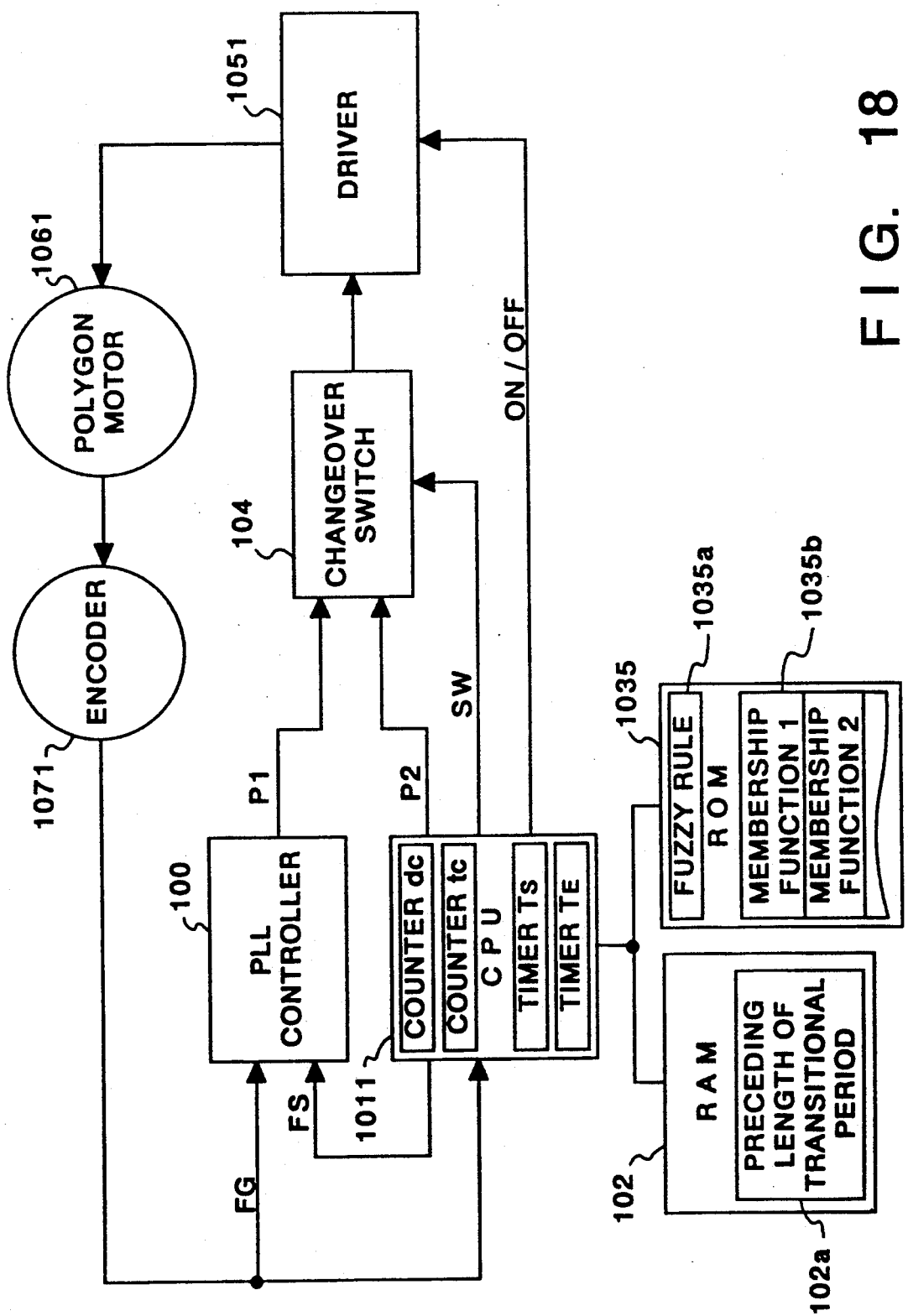
FIG. 18 is a basic block diagram of a polygon motor control section in the copying apparatus of the third embodiment.

FIG. 18 is a basic block diagram showing a polygon motor control section in a copying apparatus according to the first embodiment. Numeral 1061 denotes the motor for driving the polygon mirror 120. Numeral 1051 represents a driver of the motor 1061, and 1071 designates an encoder connected to the motor 1061 for outputting a signal synchronized to rotation of the motor 1061. Numeral 100 represents a well-known PLL control unit. In a case where the motor 1061 is rotated at a desired velocity, a reference frequency FS corresponding to the desired velocity is applied to the PLL control unit 100, whereby the latter outputs a pulse-width modulated signal P1, which serves as the velocity control signal of the motor 1061, in such a manner that a phase angle between the signal FS and an encoder signal FG from the motor 1061 attains a constant value.

Numeral 1011 denotes a CPU for processing and control for performing motor velocity control in accordance with fuzzy inferential reasoning (described below), outputting the reference frequency FS necessary to perform motor velocity control by PLL, performing forward , reverse- and stop-control by a forward-/reverse control signal F/R and drive/stop control signal ON/OFF, and performing changeover control to switch between PLL control and fuzzy control of motor velocity. The CPU 1011 has a counter $d_c$, a counter $t_c$, a timer $T_s$ and a timer $T_E$. Numeral 1035 denotes a ROM which stores a program executed by the CPU 1011, fuzzy rules 1035a, described below, and membership functions 1035b, also described below. The membership functions 1035b include a plurality of membership functions such as a Membership Function 1, Membership Function 2, ... etc. Numeral 102 denotes a RAM used as a working area when control and fuzzy inferential reasoning are performed. The RAM 102 has a time area 102a for storing the length of transitional period of fuzzy control of the last cycle. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1011.

In this embodiment, when copying is performed at the same magnification and in enlarged size, the rotational speed of the motor for driving the photosensitive drum is 180 rpm, the rotational speed of the motor for driving the polygon mirror is 8600 rpm, and the reference frequency FS is 1 KHz. When copying is performed in reduced size, the rotational speed of the motor for driving the photosensitive drum is 130 rpm, the rotational speed of the motor for driving the polygon mirror is 6200 rpm, and the reference frequency FS is 722 Hz.

EXAMPLE OF OPERATION

An example of operation under velocity control of the polygon motor by fuzzy inferential reasoning according to this embodiment will now be described. The method of fuzzy inferential reasoning is the same as in the foregoing embodiments and need not be described again.

In this embodiment, a membership function of the kind shown in FIG. 20 is provided in addition to the membership functions shown in FIGS. 3A through 3C. This membership function of the polygon-motor control variable is obtained by rewriting FIG. 3C. The particular function is selected corresponding to the length of transitional period.

AT STARTING OF THE POLYGON MOTOR

The procedure of fuzzy inferential reasoning at starting of the polygon mirror drive motor will be described with reference to the flowcharts of FIGS. 19 and 7. Portions identical with those of FIG. 6 indicate similar processing.

The routine of FIG. 19 is executed whenever the polygon motor is moved a fixed distance (d) by an encoder interrupt. The encoder-interrupt routine is used until the polygon motor attains a target velocity. On the other hand, an interrupt routine for time measurement is provided at step S20 in FIG. 7 separately of the main routine, and the counter $t_c$ is counted up at fixed times. The counter $t_c$ is cleared to zero at step S13 in the routine of FIG. 19. Accordingly, the rotational velocity of the polygon motor at this point in time is obtained from the values of the counters $d_c$, $t_c$.

First, the counter $d_c$ is counted up at step S11. Next, at step S12, the rotational velocity is obtained from the value in counter $t_c$, and the velocity deviation is computed. The counter $t_c$ is cleared to zero at step S13 when the processing of step S12 ends. The distance deviation is calculated from the value in counter $d_c$ at step S14.

Next, at step S21, on the basis of length of transitional period at the start of the polygon motor in the last preceding cycle (the time from starting of the motor until the end of control by fuzzy inferential reasoning), control is performed using the membership function the control variable of FIG. 3C when the length of transitional period at the start in the last preceding cycle is, e.g., less than 400 msec, and using the membership function of the control variable of FIG. 20 when the length of transitional period at the start in the last preceding cycle is greater than 400 msec. These membership functions are prepared in advance so as to positively correct a deviation between the target value and the length of transitional period at the start in the last preceding cycle.

Next, at steps S15 and S16, the degree of membership in the fuzzy set of the status variable regarding the traveling distance and traveling velocity is decided, and decree of membership in the fuzzy set of the control variable is obtained from this value on the basis of the fuzzy rules of FIG. 4A. When this operation is ended with regard to all rules to be considered, the program proceeds from step S15 to step S17, at which the sum of the sets belonging to each rule is calculated. The control variable having the highest possibility is calculated by obtaining the center of gravity at step S18. Next, at step S19, the center of gravity is set as PWM data for the purpose of controlling the polygon mirror drive motor.

Velocity control of the polygon mirror drive motor is changed over to PLL at the moment the rotational velocity of the polygon motor attains a set value. At the same time, the length of transitional period from start of the polygon motor up to this point in time is stored. This value is referred to at correction of the fuzzy rule in the next cycle.

AT SPEED CHANGE OF THE POLYGON MOTOR

The procedure of fuzzy inferential reasoning at a change in the rotational velocity of the polygon mirror drive motor will be described with reference to the flowcharts of FIGS. 19 and 7.

The routine of FIG. 19 is executed whenever the polygon motor is moved the fixed distance (d) by the encoder interrupt. The encoder-interrupt routine is used until the rotational velocity attains a certain set value (2nd speed) upon receipt of an instruction for changing the speed of the polygon motor. On the other hand, an interrupt routine for time measurement in FIG. 7 is provided separately of the main routine, and the counter $t_c$ is counted up at fixed times. The processing in each of the subsequent steps is the same as when the polygon motor is started except that the fuzzy rules of FIG. 4A are used at acceleration and the fuzzy rules of FIG. 4B at deceleration. When the speed is changed, control is performed using the membership function of the control variable of FIG. 3C when the length of transitional period at the speed change in the last preceding cycle is, e.g., less than 399 msec, and using the membership function of the control variable of FIG. 20 when the length of transitional period at the speed change in the last preceding cycle is greater than 300 msec. This is based on the length of transitional period at the speed change when the speed of the polygon motor is changed in the last preceding cycle (the time from the start of the speed change of the motor until the rotational velocity of the polygon motor attains the target value).

Velocity control of the polygon mirror drive motor is changed over to PLL at the moment the rotational velocity of the polygon mirror attains a set value. At the same time, the length of transitional period from the start of the speed change of the polygon motor up to this point in time is stored. This value is referred to at correction of the fuzzy rule in the next cycle.

CHANGEOVER BETWEEN FUZZY CONTROL AND PLL CONTROL

Changeover between fuzzy control and PLL control is the same as the procedure illustrated in FIG. 16 and need not be described again.

FURTHER APPLICATION OF THIRD EMBODIMENT

Figure 21:
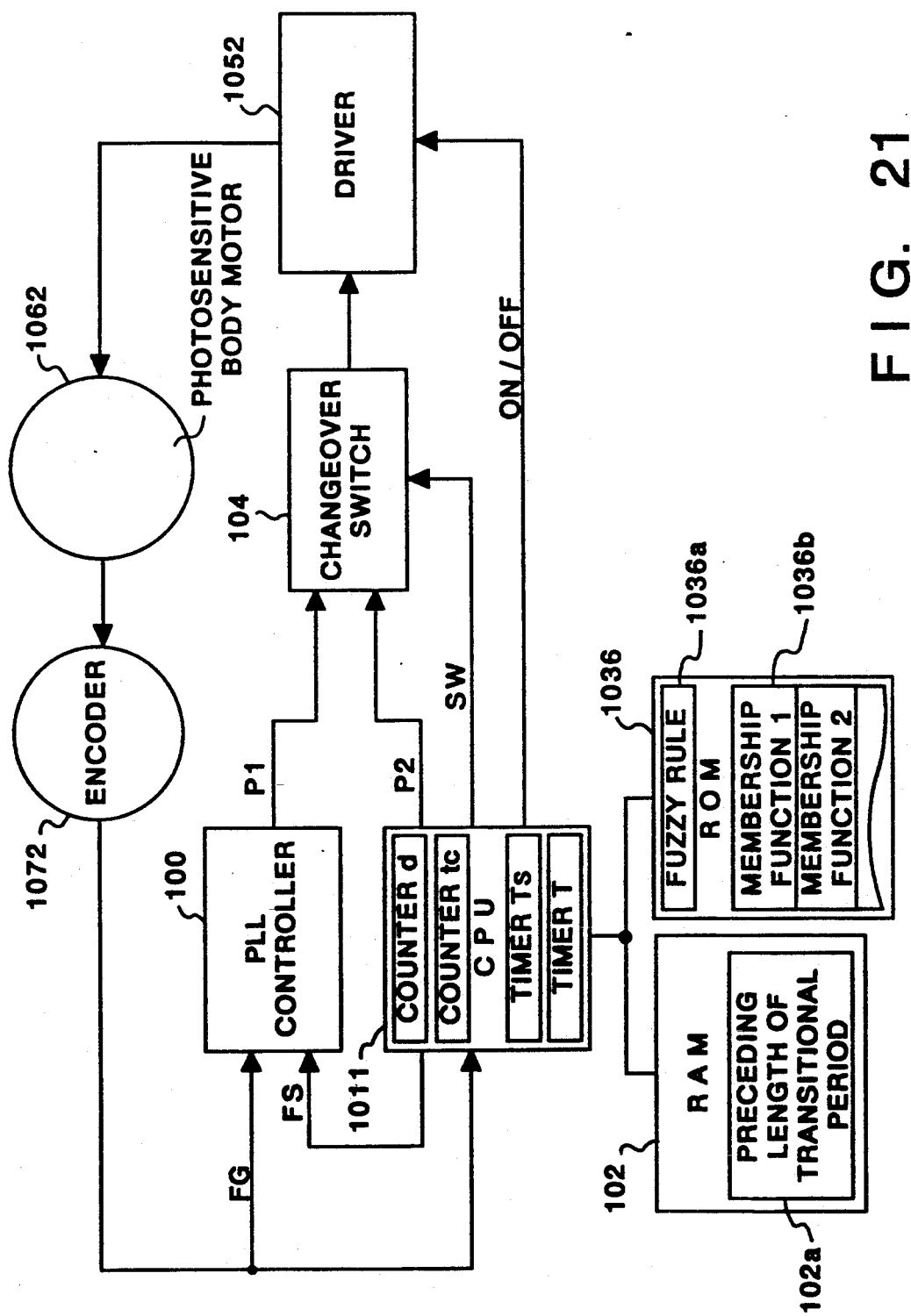
FIG. 21 is a basic block diagram of a photosensitive body drive motor control section in the copying apparatus of the third embodiment.

FIG. 21 is a basic block diagram showing a photosensitive body drive motor control section in the copying apparatus according to the third embodiment. Numeral 1062 denotes the motor for driving the photosensitive body 111. Numeral 1052 represents a driver of the motor 1062, and 1072 designates an encoder connected to the motor 1062 for outputting a signal synchronized to rotation of the motor 1062. Numeral 100 represents a well-known PLL control unit. In a case where the motor 1062 is rotated at a desired velocity, a reference frequency FS corresponding to the desired velocity is applied to the PLL control unit 100, whereby the latter outputs a pulse-width modulated signal P1, which serves as the velocity control signal of the motor 1062, in such a manner that a phase angle between the signal FS and an encoder signal FG from the motor 1062 attains a constant value.

Numeral 1011 denotes a CPU for processing and control for performing motor velocity control in accordance with fuzzy inferential reasoning (described below), outputting the reference frequency FS necessary to perform motor velocity control by PLL, performing forward-, reverse- and stop-control by a forward-/reverse control signal F/R and drive/stop control signal ON/OFF, and performing changeover control to switch between PLL control and fuzzy control of motor velocity. The CPU 1011 has a counter $d_c$, a counter $t_c$, a timer $T_S$ and a timer $T_E$. Numeral 1036 denotes a ROM which stores a program executed by the CPU 1011, fuzzy rules 1036a, described below, and membership functions 1036b, also described below. The membership functions 1036a include a plurality of membership function such as a Membership Function 1, Membership Function 2, . . . etc. Numeral 102 denotes a RAM used as a working area when control and fuzzy inferential reasoning are performed. The RAM 102 has a time area 102a for storing the length of transitional period of fuzzy control of the last cycle. Numeral 104 represents a changeover switch for changing over between a velocity control signal P1 outputted in PLL control and a velocity control signal P2 outputted in accordance with fuzzy inferential reasoning (where P1 and P2 are both pulse-width modulated signals). The switch 104 is changed over by a signal SW from the CPU 1011.

The procedure of this operation differs only with regard to the target velocity and is similar to that of the polygon mirror motor in other respects. The procedure therefore need not be described again.

Though the foregoing embodiments deal with an example in which the invention is applied to an electrophotocopier or electronic printer, the invention can be applied also to other types of image forming apparatus, such as a mechanical scanning-type printer or reader. Furthermore, it goes without saying that the invention is not limited to an image forming apparatus but can be applied also to other motors which undergo start-up and stopping control as well as to motors controlled to rotate at a fixed rotational speed.

Thus, in accordance with the present invention as described above, control based on fuzzy inferential reasoning is applied to a transitional time period such as the interval from the start of motor rotation to attainment of a steady rotational speed, or to the interval from a steady rotational speed to cessation of motor rotation, motor reversal or a change in motor speed. At steady rotation of the motor, control such as PLL control is applied to hold the rotational speed of the motor constant. Accordingly, the length of transitional period for the attainment of steady rotation or the length of transitional period to achieve a stopped state can be shortened greatly, and control at the time of steady rotation can be stabilized at a high precision.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling a motor when the motor is in a transitional period, comprising the steps of:
    calculating a control variable of velocity by fuzzy inferential reasoning from an ambiguous relationship between a control variable of velocity and at least one status variable from among the rotational velocity of the motor and the position of an object moved by the motor;
    controlling the motor based on said calculated control variable of velocity when the motor is in the transitional period; and
    controlling the motor by a control method other than fuzzy inferential reasoning when the motor is undergoing steady rotation.

2. The method according to claim 1, wherein a plurality of fuzzy rules are provided and said method further comprises the step of selecting a rule among said plurality of fuzzy rules corresponding to the length of a previous transitional period.

3. The method according to claim 2, wherein a plurality of said ambiguous relationships are provided and wherein said method further comprises the step of selecting one ambiguous relationship corresponding to the length of the previous transitional period.

4. The method according to claim 3, wherein the other control method is phase-locked loop control.

5. A method of controlling an image-exposure drive motor when an optics motor is in a transitional period, in an image forming apparatus in which a latent image is formed on a photosensitive body and made visible by developing means, comprising the steps of:
    calculating a control variable of velocity by fuzzy inferential reasoning from an ambiguous relationship between a control variable of velocity and at least one status variable from among optics motor velocity and the position of an optical system; and
    controlling the optics motor based on said calculated control variable of velocity.

6. The method according to claim 5, wherein said transitional period includes the time from the start of optics motor drive to the arrival of the optical system near a leading edge of the image, the time from the reverse of the rotating direction of the optics motor to the attainment to a target velocity, and the time after the start of velocity control for the purpose of stopping optics motor drive.

7. The method according to claim 5, wherein optics motor velocity is controlled by a phase-locked loop using the optics motor velocity and a target velocity of the optics motor in a steady state except during the transitional period.

8. An apparatus for controlling an image-exposure drive motor in an image forming apparatus in which a latent image is formed on a photosensitive body and made visible by developing means, comprising:

first optics motor velocity control means for controlling optics motor velocity by a phase-locked loop using the optics motor velocity and a target velocity of the optics motor, which are detected by an encoder of the optics motor;

status variable sensing means for sensing at least one status variable from among the optics motor velocity, the target velocity of the optics motor and the position of an optical system, which are detected by the encoder of the optics motor;

function memory means for storing a function in which the status variable and control variables of velocity are expressed by at least one ambiguous set;

rule memory means for storing relationships between the status variables and the control variables of velocity and for storing data correlating them as qualitative rules;

inferential means for calculating the set of control variables of velocity from the membership of the sensed status variable in the set of status variables in accordance with each of said rules, and inferring a control variable of velocity having the highest possibility for controlling the optics motor velocity more speedily and exactly from among the set of the control variables of velocity;

second optics motor velocity control means for controlling the optics motor velocity based on said control variable of velocity inferred by said inferential means; and control changeover means for changing over between control by said first optics motor velocity control means and said second optics motor velocity control means at a predetermined timing.

9. The apparatus according to claim 8, wherein said control changeover means performs a changeover from control by said second optics motor velocity control means to control by said first optics motor velocity control means when the optical system reaches the proximity of a leading edge of the image after the start of the optics motor drive.

10. The apparatus according to claim 8, wherein said control changeover means performs a changeover from control by said first optics motor velocity control means to control by said second optics motor velocity control means when rotating direction of the optics motor is reversed in order to reverse a traveling direction of the optical system.

11. The apparatus according to claim 8, wherein said control changeover means performs a changeover from control by said second optics motor velocity control means to control by said first optics motor velocity control means when the optics motor attains a target velocity, after its rotating direction is reversed.

12. The apparatus according to claim 10, wherein said control changeover means performs a changeover from control by said first optics motor velocity control means to control by said second optics motor velocity control means at start of velocity control for the purpose of stopping optics motor drive.

13. A method of controlling a polygon mirror drive motor when a polygon motor is in a transitional period, in an image forming apparatus in which a latent image is formed on a photosensitive body and made visible by developing means, comprising the steps of:

calculating a control variable of velocity by fuzzy inferential reasoning from an ambiguous relationship between a control variable of velocity and at least one status variable from among the polygon motor velocity and an amount of angular movement of the polygon motor; and controlling the polygon motor based on said calculated control variable of velocity.

14. The method according to claim 13, wherein said transitional period includes the time from the start of polygon motor drive to the attainment to a predetermined target velocity, and the time from the change of a target velocity of the polygon motor to the attainment to a target velocity.

15. The method according to claim 13, wherein polygon motor velocity is controlled by a phase-locked loop using the polygon motor velocity and a target velocity of the polygon motor, which are detected by an encoder, in a steady state except during the transitional period.

16. An apparatus for controlling a polygon mirror drive motor in an image forming apparatus in which a latent image is formed on a photosensitive body and made visible by developing means, comprising:

first polygon motor velocity control means for controlling polygon motor velocity by a phase-locked loop using the polygon motor velocity and a target velocity of the polygon motor, which are detected by an encoder of the polygon motor;

status variable sensing means for sensing at least one status variable from among the polygon motor velocity, a plurality of target velocities of the polygon motor and the amount of angular movement of the polygon motor, which are detected by the encoder of the polygon motor;

function memory means for storing a function in which the status variable and control variables of velocity are expressed by at least one ambiguous set;

rule memory means for storing relationships between the status variables and the control variables of velocity and for storing data correlating them as qualitative rules;

inferential means for calculating the set of control variables of velocity from the membership of the sensed status variable in the set of status variables in accordance with each of said rules, and inferring a control variable of velocity having the highest possibility for controlling the optics motor velocity more speedily and exactly from among the set of the control variables of velocity;

second polygon motor velocity control means for controlling the polygon motor velocity based on said control variable of velocity inferred by said inferential means; and control changeover means for changing over between control by said first polygon motor velocity control means and said second polygon motor velocity control means at a predetermined timing.

17. The apparatus according to claim 16, wherein said control changeover means performs a changeover from control by said second polygon motor velocity control means to control by said first polygon motor velocity control means when the polygon motor attains a target velocity after the start of polygon motor drive.

18. The apparatus according to claim 16, wherein said control changeover means performs a changeover from control by said first polygon motor velocity control means to control by said second polygon motor velocity control means when the target velocity of the polygon motor is changed.

19. The apparatus according to claim 18, wherein said control changeover means performs a changeover from control by said second polygon motor velocity control means to control by said first polygon motor velocity control means when the polygon motor attains a target velocity after the target velocity of the polygon motor is changed.

20. A method of controlling an image-exposure drive motor when an optics motor is in a transitional period, in an image forming apparatus in which a latent image is formed on a photosensitive body and made visible by developing means, comprising the steps of:

selecting a predetermined rule from among a plurality of fuzzy rules corresponding to the length of a previous transitional period;

calculating a control variable of velocity by fuzzy inferential reasoning from an ambiguous relationship between the control variable of velocity and at least one status variable from among the optics motor velocity, the optics motor target velocity and position of an optical system, which are detected by an encoder of the optics motor; and the controlling the optics motor based on the calculated control variable of velocity.

21. The method according to claim 20, wherein said transitional period includes the time from the start of optics motor drive to the arrival of the optical system near a leading edge of the image, the time from the reverse of the rotating direction of the optics motor to the attainment to a target velocity, and the time after the start of velocity control for the purpose of stopping optics motor drive.

22. The method according to claim 20, wherein, optics motor velocity is controlled by a phase-locked loop using the optics motor velocity and the target velocity of the optics motor, which are detected by the encoder in a steady state except during the transitional period.

23. An apparatus for controlling an image-exposure drive motor in an image forming apparatus in which a latent image is formed on a photosensitive body and made visible by developing means, comprising:

first optics motor velocity control means for controlling optics motor velocity by a phase-locked loop using the optics motor velocity and a target velocity of the optics motor, which are detected by an encoder of the optics motor;

status variable sensing means for sensing at least one status variable from among the optics motor velocity, the target velocity of the optics motor and the position of an optical system, which are detected by the encoder of the optics motor;

function memory means for storing a function in which the status variables and control variables of velocity are expressed by at least one ambiguous set;

rule memory means for storing relationships between the status variables and the control variables of velocity and for storing data correlating them as a plurality of qualitative rules;

selecting means for selecting, one rule from the plurality of rules stored in said rule memory means based on the length of a previous transitional period;

inferential means for calculating the set of control variables of velocity from the membership of the sensed status variable in the set of status variables in accordance with each of said rules, and inferring a control variable of velocity having the highest possibility for controlling the optics motor velocity more speedily and exactly from among the set of the control variables of velocity;

second optics motor velocity control means for controlling the optics motor velocity based on said control variable of velocity inferred by said inference means; and control changeover means for changing over between control by said first optics motor velocity control means and said second optics motor velocity control means at a predetermined timing.

24. The apparatus according to claim 23, wherein said selecting means selects said plurality of rules corresponding to a deviation of elapsed time from start of optics motor drive until the optical system reaches the proximity of a leading edge of the image; and said control changeover means performs a changeover from control by said second optics motor velocity control means to control by said first optics motor velocity control means when the optical system reaches the proximity of a leading edge of the image.

25. The apparatus according to claim 23, wherein said control changeover means performs a changeover from control by said first optics motor velocity control means to control by said second optics motor velocity control means when rotating direction of the optics motor is reversed in order to reverse a traveling direction of the optical system.

26. The apparatus according to claim 25, wherein said selecting means selects said plurality of rules a deviation of elapsed time from reversal of the rotating direction of the optics motor drive until the optics motor velocity attains a target velocity; and said control changeover means performs a changeover from control by said second optics motor velocity control means to control by said first optics motor velocity control means when the optics motor attains the target velocity.

27. The apparatus according to claim 23, wherein said control changeover means performs a changeover from control by said first optics motor velocity control means to control by said second optics motor velocity control means at start of velocity control for the purpose of stopping optics motor drive; and said selecting means selects said plurality of rules corresponding to a deviation of elapsed time up to stopping of optics motor drive.

28. A method of controlling a polygon mirror drive motor when a polygon motor is in a transitional period, in an image forming apparatus in which a latent image is formed on a photosensitive body and made visible by developing means, comprising the steps of:

selecting a predetermined rule from among a plurality of fuzzy rules corresponding to the length of a previous transitional period;

calculating a control variable velocity by fuzzy inferential reasoning from an ambiguous relationship between the control variable of velocity and at least one status variable from among the polygon motor velocity and the amount of angular movement of the polygon motor; and controlling the polygon motor based on the calculated control variable of velocity.

29. The method according to claim 28, wherein said transitional period includes the time from the start of polygon motor drive to the attainment to a target velocity, and the time from the change of a target velocity of the polygon motor to the attainment to a target velocity.

30. The method according to claim 28, wherein polygon motor velocity is controlled by a PLL using the polygon motor velocity and a target velocity of the polygon motor, which are detected by an encoder, in a steady state except during the transitional period.

31. An apparatus for controlling a polygon mirror drive motor in an image forming apparatus in which a latent image is formed on a photosensitive body and made visible by developing means, comprising:

first polygon motor velocity control means for controlling polygon motor velocity by a phase-locked loop using the polygon motor velocity and a target velocity of the polygon motor, which are detected by an encoder of the polygon motor;

status variable sensing means for sensing at least one status variable from among the polygon motor velocity, a plurality of target velocities of the polygon motor and the amount of angular movement of the polygon motor, which are detected by the encoder of the polygon motor;

function memory means for storing a function in which the status variable and control variables of velocity are expressed by at least one ambiguous set;

rule memory means for correlating and storing relationships between the status variables and the control variables of as a plurality of qualitative rules;

selecting means for selecting, one rule from the plurality of rules stored in said rule memory means based on the length of a previous transitional period;

inferential means for calculating the set of control variables of velocity from the membership of the sensed status variable in the set of status variables in accordance with each of said rules, and inferring a control variable of velocity having the highest possibility for controlling the optics motor velocity more speedily and exactly from among the set of the control variables of velocity;

second polygon motor velocity control means for controlling polygon motor velocity based on said control variable of velocity inferred by said inferential means; and control changeover means for changing over between control by said first polygon motor velocity control means and said second polygon motor velocity control means at a predetermined timing.

32. The apparatus according to claim 31, wherein said selecting means selects said plurality of rules corresponding to a deviation of elapsed time from start of polygon motor drive until the polygon motor attains a target velocity; and said control changeover means performs a changeover from control by said second polygon motor velocity control means to control by said first polygon motor velocity control means when the polygon motor attains the target velocity.

33. The apparatus according to claim 31, wherein said control changeover means performs a changeover from control by said first polygon motor velocity control means to control by said second polygon motor velocity control means when the target velocity of the polygon motor is changed.

34. The apparatus according to claim 33, wherein said selecting means selects said plurality of rules corresponding to a deviation of elapsed time from a change in the target velocity of the polygon motor until the polygon motor attains the target velocity; and said control changeover means performs a changeover from control by said second polygon motor velocity control means to control by said first polygon motor velocity control means when the polygon motor attains the target velocity after the target velocity of the polygon motor is changed.

35. A method of controlling a photosensitive drum drive motor, when a photosensitive body drive motor is in a transitional period, in an image forming apparatus in which a latent image is formed on a photosensitive body and made visible by developing means, comprising the steps of:

selecting a predetermined rule from among a plurality of fuzzy rules corresponding to a length of said transitional period;

calculating a control variable of velocity by fuzzy inferential reasoning from an ambiguous relationship between the control variable of velocity and at least one status variable from among the photosensitive body drive motor velocity and the amount of angular movement of the photosensitive body drive motor; and controlling the photosensitive body drive motor based on the calculated control variable of velocity.

36. The method according to claim 35, wherein said transitional period includes the time from the start of drive of the photosensitive body drive motor to the attainment to a predetermined target velocity, and the time from the change of a target velocity of the photosensitive body drive motor to the attainment to another target velocity.

37. The method according to claim 35, wherein, photosensitive body drive motor velocity is controlled by a PLL using the photosensitive body drive motor velocity and a target velocity of the photosensitive body drive motor, which are detected by an encoder in a steady state except during the transitional period.

38. An apparatus for controlling a photosensitive body drive motor in an image forming apparatus in which a latent image is formed on a photosensitive body and made visible by developing means, comprising:

first photosensitive body drive motor velocity control means for controlling photosensitive body drive motor velocity by a phase-locked loop using the photosensitive body drive motor velocity and a target velocity of the photosensitive body drive motor, which are detected by an encoder of the photosensitive body drive motor;

status variable sensing means for sensing at least one status variable from among the photosensitive body drive motor velocity, a plurality of target velocities of the photosensitive body drive motor and the amount of angular movement of the photosensitive body drive motor, which are detected by the encoder of the photosensitive body drive motor;

function memory means for storing a function in which the status variable and control variables of velocity are expressed by at least one ambiguous set;

rule memory means for correlating and storing relationships between the status variables and the control variables of velocity as a plurality of qualitative rules;

selecting means for selecting one rule from the plurality of rules stored in said rule memory means based on the length of a previous transitional period;

inferential means for calculating the set of control variables of velocity from the membership of the sensed status variable in the set of status variables in accordance with each of said rules, and inferring a control variable of velocity having the highest possibility for controlling the photosensitive body motor velocity more speedily and exactly from among the set of the control variables of velocity;

second photosensitive body motor velocity control means for controlling the photosensitive body drive motor velocity based on said control variable of velocity inferred by said inferential means; and control changeover means for changing over between control by said first photosensitive body drive motor velocity control means and said second photosensitive body drive motor velocity control means at a predetermined timing.

39. The apparatus according to claim 38, wherein said selecting means selects said plurality of rules corresponding to a deviation of elapsed time from start of drive of the photosensitive body drive motor until the photosensitive body drive motor attains a target velocity; and said control changeover means performs a changeover from control by said second photosensitive body drive motor velocity control means to control by said first photosensitive body drive motor velocity control means when the photosensitive body drive motor attains the target velocity.

40. The apparatus according to claim 38, wherein said control changeover means performs a changeover from control by said first photosensitive body motor velocity control means to control by said second photosensitive body motor velocity control means when the target velocity of the photosensitive body motor is changed.

41. The apparatus according to claim 40, wherein said selecting means selects said plurality of rules corresponding to a deviation of elapsed time from a change in the target velocity of the photosensitive body drive motor until the photosensitive body drive motor attains the target velocity; and said control changeover means performs a changeover from control by said second photosensitive body drive motor velocity control means to control by said first photosensitive body drive motor velocity control means when the photosensitive body drive motor attains the target velocity after the target velocity of the photosensitive body motor is changed.

42. A method of controlling a polygon mirror drive motor when a polygon motor is in a transitional period, in an image forming apparatus in which a latent image is formed on a photosensitive body and made visible by developing means, comprising the steps of:

selecting one ambiguous relationship corresponding to the length of said transitional period from a plurality of ambiguous relationships between a control variable of velocity and at least one status variable from among the polygon motor velocity and the amount of angular movement of the polygon motor;

calculating a control variable of velocity by inferential reasoning;

controlling the polygon motor based on said calculated control variable of velocity.

43. The method according to claim 42, wherein said transitional period includes the time from the start of polygon motor to the attainment to a predetermined target velocity, and the time from the change of a target velocity of the polygon motor to the attainment to another target velocity.

44. The method according to claim 42, wherein, polygon motor velocity is controlled by a phase-locked loop using the polygon motor velocity and a target velocity of the polygon motor, which are detected by an encoder, in a steady state except during the transitional period.

45. An apparatus for controlling a polygon mirror drive motor in an image forming apparatus in which a latent image is formed on a photosensitive body and made visible by developing means, comprising the steps of:

first polygon motor velocity control means for controlling polygon motor velocity by a phase-locked loop using the polygon motor velocity and a target velocity of the polygon motor, which are detected by an encoder of the polygon motor;

status variable sensing means for sensing at least one status variable from among the polygon motor velocity, a plurality of target velocities of the polygon motor and the amount of angular movement of the polygon motor, which are detected by the encoder of the polygon motor;

function memory means for storing a plurality of functions in which the status variables and control variables of velocity are expressed by at least one ambiguous set;

selecting means for selecting one function from the plurality of functions stored in said function memory means based on the length of a previous transitional period;

rule memory means for correlating and storing relationships between the status variables and the control variables of velocity as qualitative rules;

inferential means for calculating the set of control variables of velocity from the membership of the sensed status variable in the set of status variables in accordance with each of said rules, and inferring a control variable of velocity having the highest possibility for controlling the polygon motor velocity more speedily and exactly from among the set of the control variables of velocity;

second polygon motor velocity control means for controlling polygon motor velocity based on said control variable of velocity inferred by said inferential means; and control changeover means for changing over between control by said first polygon motor velocity control means and said second polygon motor velocity control means at a predetermined timing.

46. The apparatus according to claim 45, wherein said selecting means selects said plurality of functions corresponding to a deviation of elapsed time from start of polygon motor drive until the polygon motor attains a target velocity; and said control changeover means performs a changeover from control by said second polygon motor velocity control means to control by said first polygon motor velocity control means when the polygon motor attains a target velocity.

47. The apparatus according to claim 45, wherein said control changeover means performs a changeover from control by said first polygon motor velocity control means to control by said second polygon motor velocity control means when the target velocity of the polygon motor is changed.

48. The apparatus according to claim 47, wherein said selecting means selects said plurality of functions corresponding to a deviation of elapsed time from a change in the target velocity of the polygon motor until the polygon motor attains the target velocity; and said control changeover means performs a changeover from control by said second polygon motor velocity control means to control by said first polygon motor velocity control means when the polygon motor attains the target velocity after the target velocity of the polygon motor is changed.

49. A method of controlling a photosensitive body drive motor when a photosensitive body drive motor is in a transitional period, in an image forming apparatus in which a latent image is formed on a photosensitive body and made visible by developing means, comprising the steps of:

selecting one ambiguous relationship corresponding to the length of a previous transitional period from a plurality of ambiguous relationships between a control variable of velocity and at least one status variable from among the photosensitive body drive motor velocity and the amount of angular movement of the photosensitive body drive motor;

calculating a control variable of velocity by inferential reasoning; and controlling the photosensitive body drive motor based on said calculated control variable of velocity.

50. The method according to claim 49, wherein said transitional period includes the time from the start of drive of the photosensitive body drive motor to the attainment to a predetermined target velocity, and the time from the change of a target velocity of the photosensitive body drive motor to the attainment to another target velocity.

51. The method according to claim 49, wherein, photosensitive body drive motor velocity is controlled by a phase-locked loop using the photosensitive body drive motor velocity and a target velocity of the photosensitive body drive motor, which are detected by an encoder, in a steady state except during the transitional period.

52. An apparatus for controlling a photosensitive body drive motor in an image forming apparatus in which a latent image is formed on a photosensitive body and made visible by developing means, comprising:

first photosensitive body drive motor velocity control means for controlling photosensitive body drive motor velocity by a phase-locked loop using the photosensitive body drive motor velocity and a target velocity of the photosensitive body drive motor, which are detected by an encoder of the photosensitive body drive motor;

status variable sensing means for sensing at least one status variable from among the photosensitive body drive motor velocity, a plurality of target velocities of the photosensitive body drive motor and the amount of angular movement of the photosensitive body drive motor, which are detected by the encoder of the photosensitive body drive motor;

function memory means for storing a plurality of functions in which the status variables and control variables of velocity are expressed by at least one ambiguous set;

selecting means for selecting, one function from the plurality of functions stored in said function memory means based on the length of a previous transitional period;

rule memory means for correlating and storing relationships between the status variables and the control variables of velocity as qualitative rules;

inferential means for calculating the set of control variables of velocity from the membership of the sensed status variable in the set of status variables in accordance with each of said rules, and inferring a control variable of velocity having the highest possibility for controlling the photosensitive body drive motor velocity more speedily and exactly from among the set of the control variables of velocity;

second photosensitive body drive motor velocity control means for controlling the photosensitive body drive motor velocity based on said control variable of velocity inferred by said inferential means; and control changeover means for changing over between control by said first photosensitive body drive motor velocity control means and said second photosensitive body drive motor velocity control means at a predetermined timing.

53. The apparatus according to claim 52, wherein said selecting means selects said plurality of functions corresponding to a deviation of elapsed time from start of drive of the photosensitive body drive motor until the photosensitive body drive motor attains a target velocity; and said control changeover means performs a changeover from control by said second photosensitive body drive motor velocity control means to control by said first photosensitive body drive motor velocity control means when the photosensitive body drive motor attains a target velocity 54. The apparatus according to claim 52, wherein said control changeover means performs a changeover from control by said first photosensitive body drive motor velocity control means to control by said second photosensitive body drive motor velocity control means when the target velocity of the photosensitive body drive motor is changed.

55. The apparatus according to claim 54, wherein said selecting means selects said plurality of functions corresponding to a deviation of elapsed time from a change in the target velocity of the photosensitive body drive motor until the photosensitive body drive motor attains the target velocity; and said control changeover means performs a changeover from control by said second photosensitive body drive motor velocity control means to control by said first photosensitive body drive motor velocity control means when the photosensitive body drive motor attains the target velocity after the target velocity of the photosensitive body drive motor is changed.

* * * * *

UNITED STATES PATENT AND TRADEMARK OFFICE
CERTIFICATE OF CORRECTION

PATENT NO. : 5,148,089
DATED : September 15, 1992
INVENTOR(S) : HIDEKI ADACHI, ET AL.

It is certified that error appears in the above-identified patent and that said Letters Patent is hereby corrected as shown below:

On the title page, Item:

[56] REFERENCES CITED

"Fuzzylogig" should read --"Fuzzy Logic",--.

COLUMN 1

Line 10, "an" should read --as an--.
Line 31, "started" should read --started.--.
Line 35, "image" should read --image.--.

COLUMN 3

Line 58, "Fig. 3A" should read --¶ Fig. 3A--.

COLUMN 4

Line 64, "a" should read --an--.

UNITED STATES PATENT AND TRADEMARK OFFICE
CERTIFICATE OF CORRECTION

PATENT NO. : 5,148,089
DATED : September 15, 1992
INVENTOR(S) : HIDEKI ADACHI, ET AL.

It is certified that error appears in the above-identified patent and that said Letters Patent is hereby corrected as shown below:

COLUMN 5

Line 68, "variable" should read --variables--.

COLUMN 6

Line 10, "variable" should read --variables--.

COLUMN 7

Line 26, "dc" should read --$d_c$"--.
Line 36, "decree" should read --degree--.

COLUMN 10

Line 30, "decree" should read --degree--.

UNITED STATES PATENT AND TRADEMARK OFFICE
CERTIFICATE OF CORRECTION

PATENT NO.   : 5,148,089

DATED        : September 15, 1992

INVENTOR(S)  : HIDEKI ADACHI, ET AL.

It is certified that error appears in the above-identified patent and that said Letters Patent is hereby corrected as shown below:

COLUMN 11

Line 11, "stated" should read --started--.
   Line 17, "S33." should read --S133--.

COLUMN 15

Line 43, "CPU 1010" should read --CPU 1011--.

COLUMN 16

Line 20, "decree" should read --degree--.

COLUMN 18

Line 64, "forward," should read --forward-,--.

COLUMN 20

Line 19, "decree" should read --degree--.

UNITED STATES PATENT AND TRADEMARK OFFICE
CERTIFICATE OF CORRECTION

PATENT NO. : 5,148,089
DATED : September 15, 1992
INVENTOR(S) : HIDEKI ADACHI, ET AL.

It is certified that error appears in the above-identified patent and that said Letters Patent is hereby corrected as shown below:

COLUMN 25

Line 40, "and" should read --and the--.
    Line 41, "the" should be deleted.
    Line 52, "wherein," should read --wherein the--.

COLUMN 26

Line 51, "rules" should read --rules corresponding to--.

COLUMN 27

Line 24, "PLL" should read --phase-locked loop--.
    Line 51, "selecting," should read --selecting--.

COLUMN 28

Line 56, "wherein," should read --wherein--.
    Line 58, "PLL" should read --phase-locked loop--.

UNITED STATES PATENT AND TRADEMARK OFFICE
CERTIFICATE OF CORRECTION

PATENT NO. : 5,148,089
DATED     : September 15, 1992
INVENTOR(S) : HIDEKI ADACHI, ET AL.

It is certified that error appears in the above-identified patent and that said Letters Patent is hereby corrected as shown below:

<u>COLUMN 30</u>

Line 18, "reasoning;" should read --reasoning; and--.
    Line 27, "wherein," should read --wherein--.

<u>COLUMN 31</u>

Line 62, "wherein," should read --wherein--.

<u>COLUMN 32</u>

Line 24, "selecting," should read --selecting--;
    Line 61, "velocity" should read --velocity.--.

Signed and Sealed this

Twenty-sixth Day of October, 1993

Attest:

BRUCE LEHMAN

Attesting Officer      Commissioner of Patents and Trademarks